United States Patent
Tang et al.

(10) Patent No.: US 11,030,904 B2
(45) Date of Patent: Jun. 8, 2021

(54) INFORMATION PROCESSING APPARATUS, INFORMATION PROCESSING METHOD, AND VEHICLE

(71) Applicant: SONY CORPORATION, Tokyo (JP)

(72) Inventors: Yifu Tang, Kanagawa (JP); Hiroaki Takano, Saitama (JP); Hiromasa Uchiyama, Tokyo (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/080,886

(22) PCT Filed: Feb. 28, 2017

(86) PCT No.: PCT/JP2017/007630
§ 371 (c)(1),
(2) Date: Aug. 29, 2018

(87) PCT Pub. No.: WO2017/159334
PCT Pub. Date: Sep. 21, 2017

(65) Prior Publication Data
US 2019/0035279 A1    Jan. 31, 2019

(30) Foreign Application Priority Data

Mar. 14, 2016    (JP) .............................. JP2016-049231

(51) Int. Cl.
*B60R 21/00*    (2006.01)
*G08G 1/16*    (2006.01)
(Continued)

(52) U.S. Cl.
CPC ............. *G08G 1/166* (2013.01); *B60Q 9/008* (2013.01); *B60R 21/00* (2013.01); *B60W 30/09* (2013.01);
(Continued)

(58) Field of Classification Search
CPC ....... H04N 17/002; G06T 7/80; G06F 16/955; G05D 1/021; G05D 2201/0213;
(Continued)

(56) References Cited

U.S. PATENT DOCUMENTS 9,649,974 B1 *    5/2017    Arumugasamy ...... B60Q 1/085
2006/0028328 A1 *    2/2006    Cresse .................. G01S 17/931
340/435

(Continued)

FOREIGN PATENT DOCUMENTS

JP    2003-256980 A    9/2003
JP    2004-206275 A    7/2004
(Continued)

OTHER PUBLICATIONS

International Search Report and Written Opinion of PCT Application No. PCT/JP2017/007630, dated May 23, 2017, 09 pages of ISRWO.

(Continued)

*Primary Examiner* — Hai Phan
*Assistant Examiner* — Anthony D Afrifa-Kyei
(74) *Attorney, Agent, or Firm* — Chip Law Group

(57) ABSTRACT

The present disclosure relates to an information processing apparatus, an information processing method, a program, and a vehicle capable of predicting occurrence of a car traffic accident by detecting information regarding the other vehicle traveling around the vehicle and the other person who is a driver. An information processing apparatus according to a first aspect of the present disclosure includes a sensing unit that senses surrounding environment, a reception unit that receives information to prevent an accident regarding a predetermined area according to a current position, and a control unit that changes a parameter with which the sensing unit senses the surrounding environment on the (Continued)

basis of the information to prevent an accident received from the reception unit and a performance of the sensing unit. The present disclosure is capable of being applied to, for example, a car navigation system.

16 Claims, 21 Drawing Sheets

(51) Int. Cl.
| | | |
|---|---|---|
| *G08G 1/01* | (2006.01) | |
| *G06F 16/955* | (2019.01) | |
| *B60Q 9/00* | (2006.01) | |
| *B60W 30/09* | (2012.01) | |
| *B60W 50/00* | (2006.01) | |
| *G05D 1/02* | (2020.01) | |
| *G08G 1/0965* | (2006.01) | |

(52) U.S. Cl.
CPC .... *B60W 50/0097* (2013.01); *B60W 50/0098* (2013.01); *G05D 1/021* (2013.01); *G06F 16/955* (2019.01); *G08G 1/0129* (2013.01); *G08G 1/0133* (2013.01); *G08G 1/0965* (2013.01); *G05D 2201/0213* (2013.01)

(58) Field of Classification Search
CPC .. G08G 1/0129; G08G 1/0133; G08G 1/0965; G08G 1/04; G08G 1/162; G08G 1/166; B60Q 9/008; B60Q 1/085; B60Q 1/525; B60Q 2300/45; B60R 2300/80; B60R 2300/8093; B60R 1/00; B60R 2300/402; B60R 21/00; B60R 2300/308; B60R 2300/00; B60R 2300/70; B60R 2300/301; B60R 2300/304; B60W 2550/10; B60W 30/09; B60W 50/0097; B60W 50/0098
See application file for complete search history.

(56) References Cited

U.S. PATENT DOCUMENTS

| | | | | |
|---|---|---|---|---|
| 2011/0210867 A1* | 9/2011 | Benedikt | .......... | G08G 1/096716 340/905 |
| 2013/0088369 A1* | 4/2013 | Yu | .......... | B60W 40/09 340/905 |
| 2016/0150070 A1* | 5/2016 | Goren | .......... | G08G 1/096775 455/404.2 |
| 2017/0101056 A1* | 4/2017 | Park | .......... | B60R 1/00 |
| 2017/0263120 A1* | 9/2017 | Durie, Jr. | .......... | G08G 1/205 |

FOREIGN PATENT DOCUMENTS

| | | | |
|---|---|---|---|
| JP | 2006-133967 A | 5/2006 | |
| JP | 2006-163799 A | 6/2006 | |
| JP | 2006-163973 A | 6/2006 | |
| JP | 2007-329762 A | 12/2007 | |
| JP | 2008-281448 A | 11/2008 | |
| JP | 2010-026951 A | 2/2010 | |
| JP | 2010-152497 A | 7/2010 | |
| JP | 2011-113150 A | 6/2011 | |

OTHER PUBLICATIONS

Office Action for JP Patent Application No. 2016-049231, dated Aug. 25, 2020, 03 pges of Office Action and 03 pages of English Translation.

Office Action for JP Patent Application No. 2016-049231 dated Feb. 24, 2021, 03 pages of Office Action and 30 pages of English Translation.

\* cited by examiner

FIG. 3

| CORRESPONDING CONTROL SYSTEM | | | POWERTRAIN CONTROL | VEHICLE CONTROL | BODY CONTROL | TELECOMMUNICATION |
|---|---|---|---|---|---|---|
| PHYSICAL SENSOR | MECHANISTIC SENSOR | DISTANCE | | · LASER RADAR | · BACK SONAR<br>· CORNER SONAR | · SUPERSONIC WAVES<br>· LASER RADAR<br>· CCD |
| | | POSITION, ANGLE | · THROTTLE POSITION<br>· ACCELERATOR POSITION | · STEERING<br>· VEHICLE HEIGHT<br>· THROTTLE POSITION | · AIR MIX DAMPER POTENTION | |
| | | ACCELERATION, VIBRATION | · KNOCK | · ACCELERATION | · ACCELERATION<br>· SAFING<br>· COLLISION DETECTION | |
| | | ANGULAR SPEED | | · ANGULAR SPEED (YAW RATE) | | · GYRO |
| | | PRESSURE | · ENGINE INTAKE PRESSURE<br>· ATMOSPHERIC PRESSURE<br>· FUEL PRESSURE<br>· TANK INNER PRESSURE<br>· COMBUSTION PRESSURE | · BRAKE PRESSURE | · AIR CONDITIONER REFRIGERANT PRESSURE<br>· TIRE PRESSURE | |
| | | FLOW RATE | · AIR CAPACITY (AIR FLOW METER)<br>· CLOGGING | | | |
| | ELECTROMAGNETIC SENSOR | POSITION, ROTATION SPEED | · VEHICLE SPEED<br>· CRANK ANGLE (POSITION)<br>· CAM ANGLE (POSITION)<br>· ROTATION SPEED | · WHEEL SPEED<br>· VEHICLE SPEED | · AUTOMATIC ROTATION<br>· VEHICLE SPEED<br>· PROPELLER SHAFT | · TERRESTRIAL MAGNETISM<br>· VEHICLE SPEED |
| | | RADIO WAVES | | | · KEY-LESS ANTENNA | · RADIO ANTENNA<br>· GPS ANTENNA<br>· VICS ANTENNA<br>· CAR-PHONE ANTENNA |
| | OPTICAL SENSOR | LIGHT | · ENGINE FIRING PERIOD | | · SOLAR INSOLATION<br>· LIGHT (AUTOMATIC LIGHTING) | |
| | TEMPERATURE SENSOR | TEMPERATURE | · ENGINE WATER TEMPERATURE<br>· FUEL AMOUNT<br>· INTAKE AIR TEMPERATURE<br>· EXHAUST GAS TEMPERATURE | | · INNER TEMPERATURE, EXTERNAL TEMPERATURE<br>· EVAPORATOR OUTLET TEMPERATURE<br>· WATER TEMPERATURE<br>· OCCUPANT<br>· AUTOMATIC OIL TEMPERATURE | |
| CHEMICAL SENSOR | ELECTROCHEMICAL SENSOR | GAS CONCENTRATION | · $O_2$ (OXYGEN)<br>· A/F (AIR-FUEL RATIO)<br>· HC, $NO_x$ | | · SMOKE (SMOKE IN CAR)<br>· GAS (CO)<br>· HUMIDITY | |

PUPIL/IRIS DETECTING SENSOR, FIVE SENSES SENSOR (VISUAL SENSE, HEARING SENSE, TACTILE SENSE, GUSTATORY SENSE, AND OLFACTORY SENSE),
VITAL SENSOR (PULSE RATE, HEART RATE, BLOOD PRESSURE, TEMPERATURE, AND RESPIRATION RATE), VOICE RECOGNITION SENSOR, AND THE LIKE

FIG. 4

| The factor whose information is needed | | | Sensor to activate | Communication-unit |
|---|---|---|---|---|
| General information | Location (latitude, longitude) | | GPS | off |
| | Time and date | | GPS | off |
| Human factor | Driver's personality | | | on |
| | Driving experience | | | on |
| | Driving habits | | | on |
| | Delinquency record | | | on |
| | Driver's physical and mental state | | PUPIL/IRIS DETECTING SENSOR, FIVE SENSES SENSOR (VISUAL SENSE, HEARING SENSE, TACTILE SENSE, GUSTATORY SENSE, AND OLFACTORY SENSE), VITAL SENSOR (PULSE RATE, HEART RATE, BLOOD PRESSURE, TEMPERATURE, AND RESPIRATION RATE), VOICE RECOGNITION SENSOR, AND THE LIKE | on |
| Non-human factor | vehicle | Type and dimension | | on |
| | | Repairing record | | on |
| | | Speed | VEHICLE SPEED, WHEEL SPEED, AUTOMATIC ROTATION, ROTATION SPEED, AND THE LIKE | off |
| | | Acceleration | ACCELERATION AND THE LIKE | off |
| | | Direction and position | BACK SONAR, CORNER SONAR, THROTTLE POSITION, ACCELERATOR POSITION, STEERING, VEHICLE HEIGHT, AIR MIX DAMPER POTENTION, CRANK ANGLE, CAM ANGLE, AND THE LIKE | off |
| | | State of self-vehicle (temperature, vibration, pressure etc.) | KNOCK, SAFING, COLLISION DETECTION, ENGINE INTAKE PRESSURE, FUEL PRESSURE, COMBUSTION PRESSURE, TANK INNER PRESSURE, BRAKE PRESSURE, AIR CONDITIONER REFRIGERANT PRESSURE, ENGINE FIRING PERIOD, ENGINE WATER TEMPERATURE, FUEL AMOUNT, INTAKE AIR TEMPERATURE, EXHAUST GAS TEMPERATURE, INNER TEMPERATURE, EXTERNAL TEMPERATURE, EVAPORATOR OUTLET TEMPERATURE, OCCUPANT, AUTOMATIC OIL TEMPERATURE, SMOKE, GAS, AIR-FUEL RATIO, AND THE LIKE | off |
| | | Neighbor vehicle | LASER RADAR, ULTRASONIC WAVES, CCD BACK SONAR | on |
| | Road | Slope, visibility, width, etc. | CCD, GPS, LASER RADAR, ULTRASONIC WAVES, VEHICLE HEIGHT, VEHICLE SPEED, ACCELERATION, SOLAR ISOLATION, LIGHT, AND THE LIKE | on |
| | Weather | Weather, temperature, pressure, humidity etc. | CCD, ATMOSPHERIC PRESSURE, AIR PRESSURE, AIR AMOUNT, TERRESTRIAL MAGNETISM, SOLAR ISOLATION, LIGHT, OXYGEN, HC, NOx, HUMIDITY, AND THE LIKE | on |

FIG. 5

| Accident ID | Number of damaged vehicles | Number of dead people | Number of slightly injured people | Number of severely injured people |
|---|---|---|---|---|
| 1 | 1 | 0 | 1 | 0 |
| 2 | 2 | 0 | 3 | 0 |
| 3 | 2 | 1 | 1 | 1 |
| 4 | 4 | 2 | 0 | 2 |
| 5 | 1 | 1 | 0 | 4 |

*FIG. 6*

| Accident ID | Driver's bad state | Lack of experience | Bad state of vehicle | Road slope | Rain | Fog | Snow | Night |
|---|---|---|---|---|---|---|---|---|
| 1 | N | Y | N | Y | Y | N | N | N |
| 2 | Y | N | Y | N | Y | N | N | Y |
| 3 | N | Y | Y | Y | Y | N | N | N |
| 4 | N | Y | N | Y | Y | N | N | Y |
| 5 | N | N | N | N | N | Y | N | N |

FIG. 7

| Factor of area A | Eigenvalue of factor |
|---|---|
| Rainfall | 110 mm/h |
| Road slope | 40 degrees |
| Driver's driving experience | 6 months |

FIG. 8

| ACCIDENT TYPE | KEY FACTOR | SENSOR CORRESPONDING TO KEY FACTOR | RECOMMENDED DRIVE MODE |
|---|---|---|---|
| CAR-TO-CAR | RAIN, INATTENTIVE DRIVING | → SENSING: INFRARED RADAR, DRIVER MONITOR<br>→ DRIVING: MANUAL DRIVE AT SPEED OF EQUAL TO OR SLOWER THAN 40 km/h | → SENSING: MILLIMETER WAVE RADAR, WIPER SENSOR, DRIVER MONITOR<br>→ AUTOMATIC DRIVE AT SPEED OF EQUAL TO OR SLOWER THAN 30 km/h |
| CAR-TO-BICYCLE | NIGHT, OVERSPEED | → SENSING: INFRARED RADAR<br>→ DRIVING: MANUAL DRIVE AT SPEED OF EQUAL TO OR SLOWER THAN 60 km/h | → SENSING: MILLIMETER WAVE RADAR, SPEED SENSOR, DRIVER MONITOR<br>→ AUTOMATIC DRIVE AT SPEED OF EQUAL TO OR SLOWER THAN 60 km/h |
| CAR-TO-PEDESTRIAN | INATTENTIVE DRIVING | → SENSING: INFRARED RADAR<br>→ DRIVING: MANUAL DRIVE AT SPEED OF EQUAL TO OR SLOWER THAN 30 km/h | → SENSING: INFRARED RADAR, HUMAN-CAR COMMUNICATION, CAMERA<br>→ DRIVING: MANUAL DRIVE AT SPEED OF EQUAL TO OR SLOWER THAN 30 km/h |

FIG. 9

| Parameter set ID | Rainfall (mm/h) | Road slope(degrees) | Driver's driving experience (month) |
|---|---|---|---|
| 1 | 0 | 10 | 60 |
| 2 | 108 | 41 | 6 |
| 3 | 150 | 60 | 2 |
| 4 | 150 | 60 | 12 |
| 5 | 150 | 30 | 12 |

FIG. 10

| Needed vehicle system set | Speed can be adjusted automatically | Wipe can be used | Driver's driving experience (month) |
|---|---|---|---|
| 1 | Yes | Yes | 18 |
| 2 | Yes | Yes | 2 |
| 3 | Yes | No | 2 |
| 4 | No | No | 2 |

FIG. 11

| Sensing parameter | Normal level | Low level |
|---|---|---|
| Frequency(s$^{-1}$) | 1/30 | 1/600 |
| Region(m*m) | 15*15 | 5*5 |
| Resolution(dpi) | 900 | 300 |
| Sensibility | High | Low |

FIG. 12

| Scenario ID | Rainfall (mm/h) | Road slope(degrees) | Driver's driving experience (month) |
|---|---|---|---|
| 1 | 108 | 60 | 2 |
| 2 | 108 | 43 | 12 |
| 3 | 150 | 55 | 3 |
| 4 | 0 | 20 | 1 |
| 5 | 0 | 10 | 60 |

INFORMATION PROCESSING APPARATUS, INFORMATION PROCESSING METHOD, AND VEHICLE

CROSS REFERENCE TO RELATED APPLICATIONS

This application is a U.S. National Phase of International Patent Application No. PCT/JP2017/007630 filed on Feb. 28, 2017, which claims priority benefit of Japanese Patent Application No. JP 2016-049231 filed in the Japan Patent Office on Mar. 14, 2016. Each of the above-referenced applications is hereby incorporated herein by reference in its entirety.

TECHNICAL FIELD

The present disclosure relates to an information processing apparatus, an information processing method, a program, and a vehicle, and for example, more particularly, to an information processing apparatus, an image processing method, a program, and a vehicle that can predict occurrence of a traffic accident of a vehicle including a car.

BACKGROUND ART

In recent years, traffic accidents have become one of the most fatal accidents in daily life. Hereinafter, a car that is driven by a driver is referred to as a vehicle, and the other car traveling around the vehicle is referred to as the other vehicle. In addition, a driver of the other vehicle is referred to as the other person. In addition, the traffic accidents include accidents such as a car-to-car accident, a car-to-bicycle (including bike) accident, and a car-to-pedestrian accident.

Factors of the traffic accidents are classified into human factors and environmental factors.

The human factor includes a lack of skill and experience of the driver, careless drive by the driver, aggressive driving by the driver, and the like.

The environmental factors include road conditions, weather conditions, influences from other vehicles, and the like.

As a measure for preventing a traffic accident caused by the human factors, there is one that detects physiological data of the driver during driving, state information of the vehicle, traffic information, traveling history information, and the like, estimates objective driving habits of the driver on the basis of the detected information, and presents the estimated habits to the driver (for example, refer to Patent Document).

As measures for preventing a traffic accident caused by the environmental factors, there is one that accumulates information regarding traffic accidents occurred in the past in a database and warns the driver in a case where the vehicle is traveling in a dangerous area where the traffic accidents have frequently occurred in the past (for example, refer to Patent Document 2).

Furthermore, there has also been proposed a device that detects a relative position between the vehicle and the other vehicle, a movement of the other vehicle, and the like, predicts occurrence of a traffic accident caused by the other vehicle, and alerts the driver (for example, refer to Patent Document 3).

CITATION LIST

Patent Document

Patent Document 1: Japanese Patent Application Laid-Open No. 2010-152497
Patent Document 2: Japanese Patent Application Laid-Open No. 2006-163973
Patent Document 3: Japanese Patent Application Laid-Open No. 2011-113150

SUMMARY OF THE INVENTION

Problems to be Solved by the Invention

As described above, there are inventions for predicting occurrence of a traffic accident by detecting a movement of the other vehicle. However, even if the other person who drives the other vehicle has the human factors as described above, the vehicle cannot detect the factor and cannot predict occurrence of an accident.

The present disclosure has been made in view of the above circumstances, and an object of the present disclosure is to predict occurrence of a car traffic accident detecting information regarding the other vehicle traveling around the vehicle and the other person who is a driver of the vehicle.

Solutions to Problems

An information processing apparatus according to a first aspect of the present disclosure includes a sensing unit that senses surrounding environment, a reception unit that receives information to prevent an accident regarding a predetermined area according to a current position, and a control unit that changes a parameter with which the sensing unit senses the surrounding environment on the basis of the information to prevent an accident received from the reception unit and a performance of the sensing unit.

The information to prevent an accident can include information regarding a condition of a past traffic accident, information regarding a predetermined parameter to be set at the time of traveling, or a predetermined parameter with which the sensing unit senses the surrounding environment.

The control unit can issue a warning by an image or sound on the basis of the information to prevent an accident received from the reception unit.

The control unit can issue a warning on the basis of the information to prevent an accident received from the reception unit and the performance of the sensing unit.

The control unit can control to notify and execute a recommended drive mode on the basis of the information to prevent an accident received from the reception unit.

The information processing apparatus according to the first aspect of the present disclosure, can further include a determination unit that determines a warning level regarding a traffic accident in which a first vehicle may be involved on the basis of the information to prevent an accident received from the reception unit, and a warning unit that presents a warning to a driver of the first vehicle according to the determined warning level.

The warning unit can present a warning to the driver of the first vehicle according to feedback information indicating whether a recommended drive mode can be executed.

The recommended drive mode can include at least one of a limited traveling speed, on/off of lights, on/off of wipers, on/off of defrosters, an audio volume, activation of various sensors, use of automatic drive (speed control, steering control, front vehicle following, automatic braking, and the like), and change of a traveling route.

The information to prevent an accident received from the reception unit can include a key factor of the traffic accident and a threshold value of the key factor.

The determination unit can determine a stepwise warning level regarding the traffic accident in which the first vehicle may be involved on the basis of the number of key factors of which collected value exceeds the threshold value.

The information processing apparatus according to the first aspect of the present disclosure, can further include an acquisition unit that acquires information regarding traffic accidents occurred in the past, an analysis unit that analyzes the acquired information regarding the traffic accidents occurred in the past, and an accumulation unit that accumulates the analysis result of the acquired information regarding the traffic accidents occurred in the past in association with each area.

The information regarding the traffic accidents occurred in the past can include at least one of a date and time, a place, weather, a road condition, an accident situation, vehicle information, or driver's information.

The control unit can change a sensing mode of the sensing unit to a high mode in a case where a comparison result of the analysis result of the traffic accidents occurred in the past with sensed information cannot be adopted.

The control unit can change the sensing mode of the sensing unit to a low mode in a case where the recommended drive mode can be executed.

The sensing unit can collect information regarding a second vehicle traveling around the first vehicle from the second vehicle via V2V communication.

An information processing method according to the first aspect of the present disclosure includes a sensing step of sensing surrounding environment, a reception step of receiving information to prevent an accident regarding a predetermined area according to a current position, and a control step of changing a parameter used to sense the surrounding environment in the sensing step on the basis of the received information to prevent an accident and a sensing performance performed by an information processing apparatus.

A program according to the first aspect of the present disclosure causes a computer to function as a sensing unit that senses surrounding environment, a reception unit that receives information to prevent an accident regarding a predetermined area according to a current position, and a control unit that changes a parameter with which the sensing unit senses the surrounding environment on the basis of the information to prevent an accident received from the reception unit and a performance of the sensing unit.

In the first aspect of the present disclosure, the surrounding environment is sensed, the information to prevent an accident in the predetermined area according to the current position is received, and the parameter to sense the surrounding environment is changed on the basis of the received information to prevent an accident and the sensing performance.

A vehicle according to a second aspect of the present disclosure for traveling according to an operation by a driver, the vehicle includes an information processing unit that predicts a traffic accident in which the vehicle may be involved and a power supply unit that supplies power to the information processing unit, in which the information processing unit includes a sensing unit that senses surrounding environment, a reception unit that receives information to prevent an accident regarding a predetermined area according to a current position, and a control unit that changes a parameter with which the sensing unit senses the surrounding environment on the basis of the information to prevent an accident received from the reception unit and a performance of the sensing unit.

In the second aspect of the present disclosure, the surrounding environment is sensed, the information to prevent an accident in the predetermined area according to the current position is received, and the parameter to sense the surrounding environment is changed on the basis of the received information to prevent an accident and the sensing performance.

Effects of the Invention

According to the first and second aspect of the present disclosure, occurrence of a car traffic accident can be predicted by detecting information regarding the other vehicle traveling around the vehicle and the other person who is a driver of the other vehicle.

BRIEF DESCRIPTION OF DRAWINGS

FIG. 3 is a diagram of an example of correspondence relation between various sensors included in the vehicle and information that can be detected by the sensors.

FIG. 4 is a diagram of an example of correspondence relation between sensors for detecting real-time vehicle information and driver's information.

FIG. 5 is a diagram of an example of past accident information.

FIG. 6 is a diagram of factors of the past accident information.

FIG. 7 is a diagram of an example of threshold values of key factors.

FIG. 8 is a diagram of an example of relation between the key factors and recommended drive modes.

FIG. 9 is a diagram of an example of a combination of real-time data.

FIG. 10 is a diagram of an example of feedback information.

FIG. 11 is a diagram of a difference in sensing modes.

FIG. 12 is a diagram of an example of a combination of real-time data.

MODE FOR CARRYING OUT THE INVENTION

Hereinafter, best modes (referred to as embodiments below) for carrying out the present disclosure will be described in detail with reference to the drawings.

<Exemplary Configuration of System Including Vehicle to which Present Disclosure is Applied>

Figure 1:
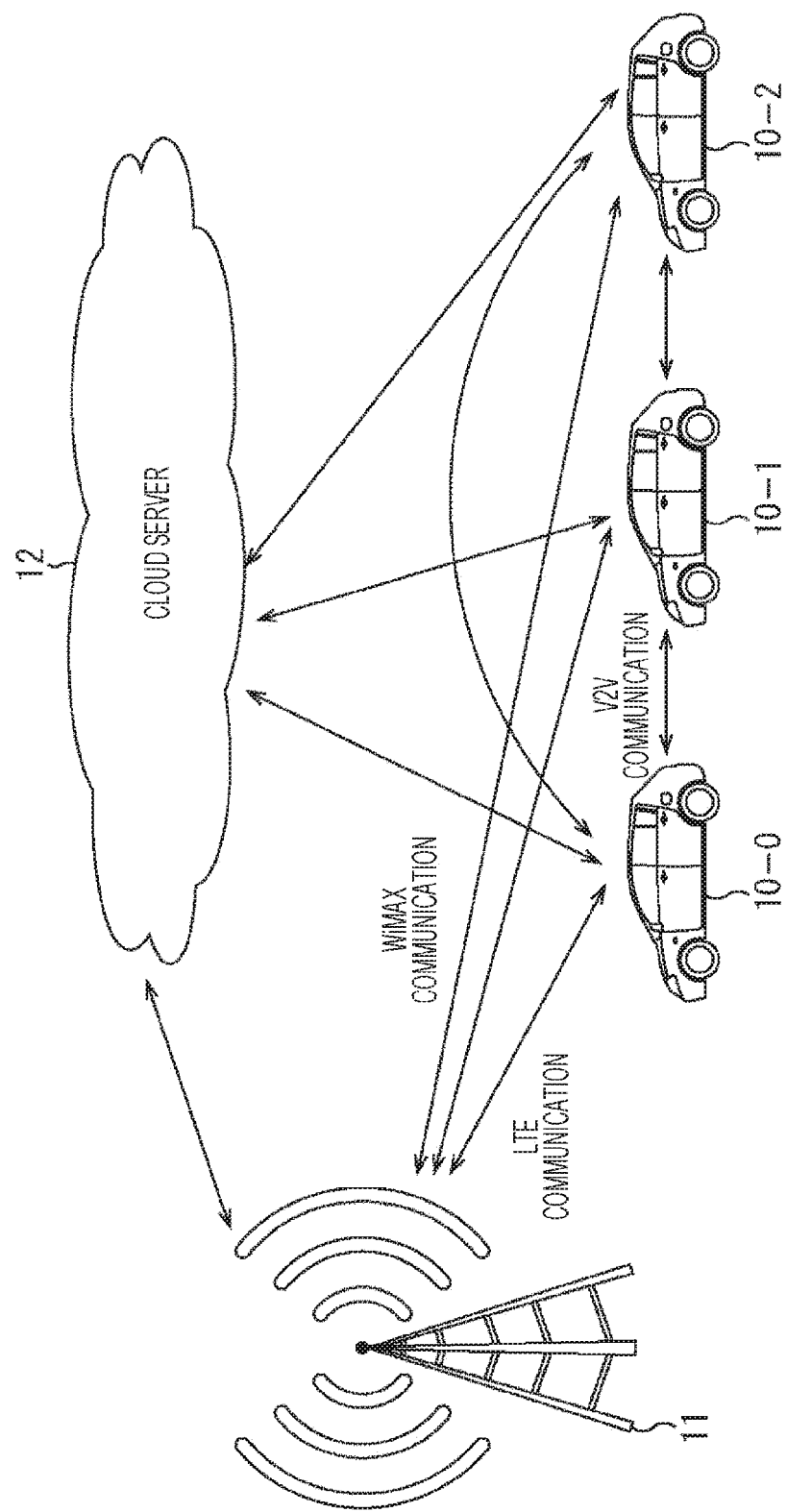
FIG. 1 is a diagram of an exemplary configuration of a system including a vehicle to which the present disclosure is applied.

FIG. 1 illustrates an exemplary configuration of a system including a vehicle to which the present disclosure is applied.

A vehicle 10 represented by a car transmits information indicating the state of the vehicle (referred to as "vehicle information" below) to a cloud server 12 via a wireless communication network (including communication base station 11) such as LTE communication and WiMAX. Furthermore, the vehicle 10 acquires information regarding past traffic accidents in each area of a predetermined size (referred to as past accident information below) accumulated in the cloud server 12 and information of time when a traffic accident does not occur in each area of a predetermined size (referred to as "safe driving information" below). Furthermore, the vehicle 10 acquires real-time information such as information regarding road conditions and information regarding weather from the cloud server 12.

In addition, the vehicle 10 (for example, vehicle 10-0) transmits the driver's information and the vehicle information in real time through Vehicle-Vehicle (V2V) communication with the other vehicle 10 travelling around the vehicle 10 (for example, vehicle 10-1). In addition, in a case of predicting an occurrence of a traffic accident, the vehicle 10 notifies that of the other vehicle 10 in real time.

Furthermore, the vehicle 10 can share various information acquired from the cloud server 12 with other vehicle through V2V communication.

<Exemplary Configuration of Information Processing Apparatus Mounted in Vehicle 10>

Figure 2:
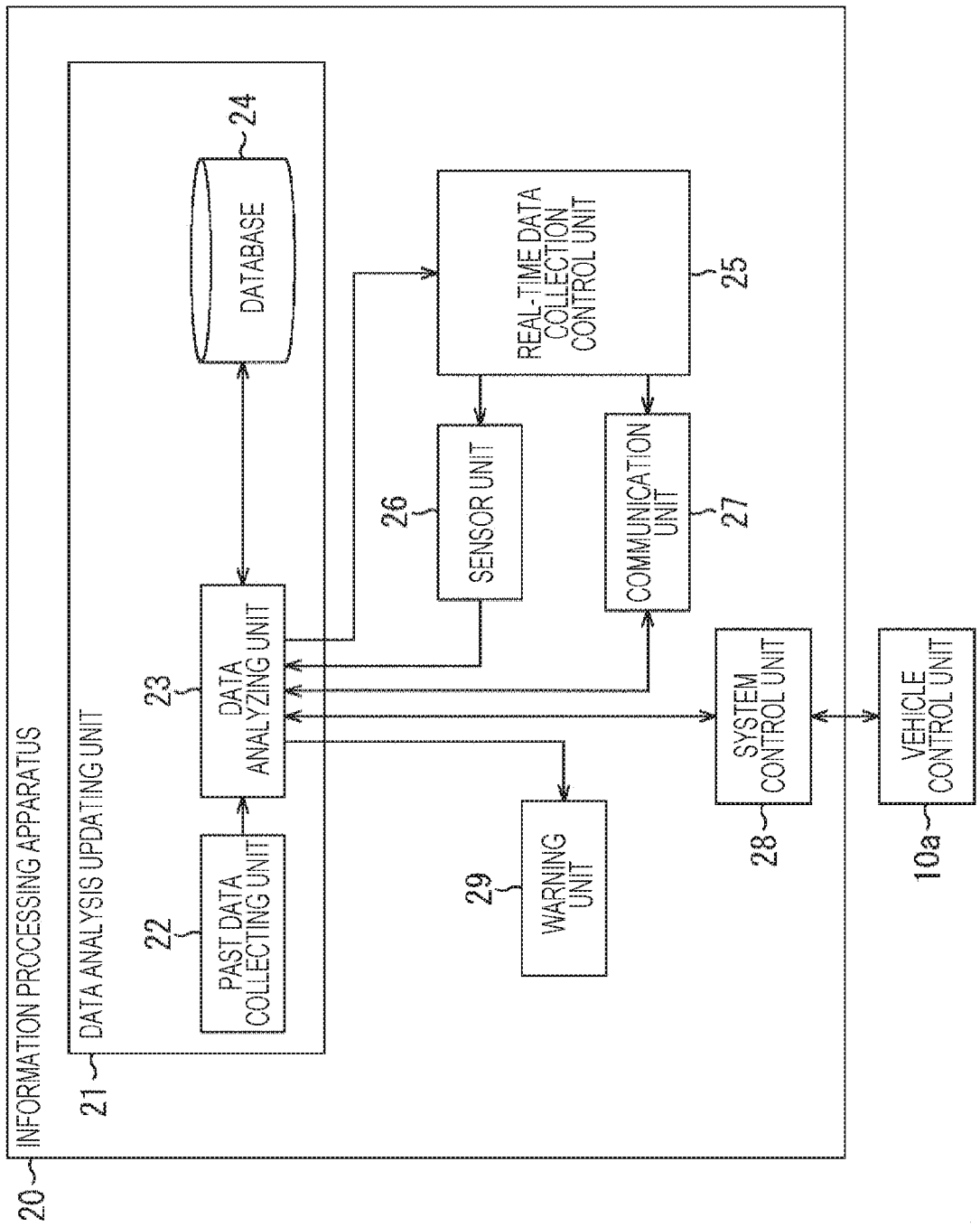
FIG. 2 is a block diagram of an exemplary configuration of an information processing apparatus to which the present disclosure is applied.

FIG. 2 illustrates an exemplary configuration of an information processing apparatus mounted in the vehicle 10.

The information processing apparatus 20 issues a stepwise warning in a case where there is a possibility that the vehicle 10 in which the information processing apparatus 20 is mounted is involved in the traffic accident and executes accident predicting processing and information accumulating processing which is executed as a preparation for the accident predicting processing in advance (both processing will be described later).

The information processing apparatus 20 includes a data analysis updating unit 21, a real-time data collection control unit 25, a sensor unit 26, a communication unit 27, a system control unit 28, and a warning unit 29.

The data analysis updating unit 21 includes a past data collecting unit 22, a data analyzing unit 23, and a database 24.

The past data collecting unit 22 acquires the past accident information and the safe driving information from the cloud server 12, for example, and supplies the information to the data analyzing unit 23.

The past accident information includes dates, places, weather, road conditions, accident situations, vehicle information, and driver's information regarding traffic accidents occurred in the past.

The weather includes, for example, classification such as sunny, cloudy, rain, snow, fog, strong wind, a temperature, a humidity, an atmospheric pressure, and brightness. For example, the road conditions include road types such as a general road, an expressway, a mountain road, a farm road, and an elevated road, shapes of the roads such as a straight line, a curve, a T-shaped road, a pavement material, a road width, a slope, planarity, and a curvature of a curve.

The accident situations include, for example, the number of dead, the number of seriously injured people, the number of slightly injured people, damaged states of vehicles and others, and the number of involved vehicles. The vehicle information includes, for example, a manufacturer, a vehicle type, a model year, a size, a weight, a date of manufacture, a cumulative travel distance, a traveling speed, a capacity, a load, a tire pressure, operation conditions of lights, wipers, defrosters, and the like.

The driver's information includes, for example, an age, a gender, a height, a weight, a visual acuity, a pulse rate, a heart rate, a blood pressure, a respiration rate, the number of times of blinks and yawning, personality, a medical history, a medication history, a driver's license type, a driving history, a traffic accident history, a traffic violation history, and a criminal record.

The safe driving information includes weather, a road condition, vehicle information and driver's information at the time when an accident does not occur in each area.

The data analyzing unit 23 analyzes the past accident information supplied from the past data collecting unit 22 in the information accumulating processing and determines a main factor (key factor) and a threshold value of a traffic accident occurred in each area of a predetermined size.

Furthermore, in the information accumulating processing, the data analyzing unit 23 determines the recommended drive mode for each area with a predetermined size (including a limited traveling speed, on/off of lights, on/off of wipers, on/off of defrosters, audio volume, activation of various sensors, use of automatic drive (including speed control, steering control, front vehicle following, automatic braking, and the like), change of traveling route, and the like) on the basis of the determined key factor of the traffic accident, the threshold value, and the safe driving information supplied from the past data collecting unit 22.

Note that the information accumulating processing by the data analyzing unit 23 may be executed at a predetermined cycle (for example, once a day, once a week, or once a month).

Furthermore, the cloud server 12 may analyze the past accident information and the safe driving information instead of the data analyzing unit 23.

In the accident predicting processing, the data analyzing unit 23 predicts occurrence of a traffic accident by analyzing the real-time vehicle information and driver's information of the vehicle supplied from the sensor unit 26 and vehicle information and driver's information of the other vehicle supplied from the communication unit 27. Specifically, a warning level is determined on the basis of the result of comparison between one or more key factors of the traffic accident and a threshold value α corresponding thereto. Then, the data analyzing unit 23 notifies the determined warning level of the warning unit 29 and notifies the recommended drive mode of the system control unit 28.

The warning level to be notified to the warning unit 29 is divided into, for example, three stages. If the number k of key factors that greatly exceed the threshold value is equal to or more than zero and less than a first threshold value n, the warning level is set to a low level. If the number k of key factors that greatly exceeds the threshold value is equal to or more than the first threshold value n and less than a second threshold value m which is larger than the first threshold value, the warning level is set to a middle level. If the number k of key factors that greatly exceed the threshold value is equal to or more than the second threshold value m, the warning level is set to a high level.

| | |
|---|---|
| 0 ≤ k < n | low level |
| n ≤ k < m | middle level |
| m ≤ k | high level |

However, in a case where the driving history is compared with a threshold value as a key factor, magnitude relationship of the values is reversed to that of the above case. That is, in a case where a precipitation amount as a key factor is compared with the threshold value α, it is compared whether the precipitation amount is greatly larger than the threshold value α. On the other hand, in a case where the driving history as a key factor is compared with the threshold value α, it is compared whether the driving history is greatly smaller than the threshold value α.

In addition, in the accident predicting processing, the data analyzing unit 23 notifies a sensing mode (low mode (energy saving mode), normal mode, or high mode) of the real-time data collection control unit 25 on the basis of the feedback information from the system control unit 28 to which the recommended drive mode is notified.

In each sensing mode, a sensing period (frequency), a range, a resolution, sensitivity, and the like are different. In the low mode (energy saving mode), the sensing period is set to be longer, the range is set to be narrower, the resolution is set to be lower, and the sensitivity is set to be lower than those in the normal mode. With this setting, consumption of resources and the like such as power required for sensing can be reduced.

Conversely, in the high mode, the sensing period is set to be shorter, the range is set to be wider, the resolution is set to be higher, and the sensitivity is set to be higher than those in the normal mode. With this setting, while the consumption of resources required for sensing increases, it is possible to acquire sensing data useful for prediction of the traffic accidents.

In the database 24, the analysis result of the data analyzing unit 23, that is, the key factor of the traffic accident for each area, the threshold value of the key factor, and the recommended drive mode are accumulated and updated each time.

Furthermore, in the database 24, position information of dangerous areas (area where accidents frequently occur) and the driver's information of the vehicle that is not real-time information (for example, age, gender, height, weight, visual acuity, medical history, driving history, traffic accident history, traffic violation history, and the like) are accumulated.

The real-time data collection control unit 25 designates the type of the data to be sensed relative to the sensor unit 26 and sets the sensing mode on the basis of the key factors of the dangerous area notified from the database 24 via the data analyzing unit 23. Then, the real-time data collection control unit 25 makes the sensor unit 26 acquire real-time vehicle information (for example, traveling speed, load, tire pressure, and operation conditions of lights, wipers, and defrosters) and driver's information (pupil opening degree, pulse rate, heart rate, blood pressure, respiration rate, the number of times of blinks and yawning, and the like). In addition, the real-time data collection control unit 25 controls the communication unit 27 to acquire vehicle information and driver's information of the other vehicle.

The sensor unit 26 controls various sensors included in the vehicle 10 according to the set sensing mode and acquires the real-time vehicle information and the real-time driver's information designated by the real-time data collection control unit 25 and supplies the information to the data analyzing unit 23.

FIG. 3 illustrates correspondence relation between various sensors included in the vehicle 10 and information obtained by the sensors.

FIG. 4 illustrates an example of correspondence relation between the real-time vehicle information and the real-time driver's information and various sensors for detecting these information.

For example, a position and a data of the vehicle 10 as general information can be acquired by a GPS sensor. The driver's information can be collected by, for example, a pupil/iris detecting sensor, a five senses sensor, a vital sensor, a sound recognition sensor, and the like. The vehicle information, the road conditions, and external air conditions can be acquired by corresponding sensors.

The communication unit 27 acquires the vehicle information and the driver's information of the other vehicle through the wireless communication network or the V2V communication with the other vehicle and supplies the information to the data analyzing unit 23.

Regarding the execution of the recommended drive mode notified from the data analyzing unit 23, the system control unit 28 confirms whether the recommended drive mode is executed as requesting to a vehicle control unit 10a mounted in the vehicle 10 (it is determined whether required function is included, and whether the function can be activated in a case where the function is included) and feeds back the confirmation result (feedback information) to the data analyzing unit 23.

The warning unit 29 issues a warning to attract attention of the driver by changing a period, a volume, a GUI display method, and the like according to the three-stage warning level (low level, middle level, or high level) notified from the data analyzing unit 23.

For example, in a case where the warning level is a high level, the warning is issued at a short period until the warning level is lowered to at least the middle level. In a case where the warning level is a middle level, the warning is issued at least once. In a case where the warning level is a low level, no warning is issued. However, the warning may be issued in a case where the warning level is a low level.

<Determination of Key Factor of Traffic Accident and Threshold Value by Data Analyzing Unit 23>

Next, a specifying method of a key factor of a traffic accident and a threshold value of the key factor in the information accumulating processing of the data analyzing unit 23 will be described.

The data analyzing unit 23 calculates an accident coefficient $C_k$ indicating severity of a traffic accident k defined by the following formula (1) on the basis of the past accident information supplied from the past data collecting unit 22.

[Mathematical Formula 1]

$$C_k = N_{vehicle} * C_{vehicle} + N_{death} * C_{death} + \sum_{i=0,1} N_{(injury,i)} * C_{(injury,i)} \quad (1)$$

Here, $N_{vehicle}$ is a value indicating the number of vehicles damaged by the accident.

$C_{vehicle}$ is a coefficient to be multiplied by $N_{vehicle}$ and is set to 0.1.

$N_{death}$ is a value indicating the number of people who died from the accident.

$C_{death}$ is a coefficient to be multiplied by $N_{death}$ and is set to 0.5.

$N_{(injury,\ 0)}$ is a value indicating the number of slightly injured people.

$N_{(injury,\ 1)}$ is a value indicating the number of seriously injured people.

$C_{(injury,\ 0)}$ is a coefficient to be multiplied by $N_{(injury,\ 0)}$ and is set to 0.1.

$C_{(injury,\ 1)}$ is a coefficient to be multiplied by $N_{(injury,\ 1)}$ is set to 0.2.

Note that the value of each coefficient is merely an example and may be other values. Furthermore, the accident coefficient $C_k$ may be calculated by using a formula other than the formula (1).

Next, the data analyzing unit 23 calculates a sum of the accident coefficients $C_k$ of the affected traffic accidents as defined by the following formula (2) as a factor coefficient $C_{Fi}$ indicating a degree of an effect of each factor $F_i$ (for example, driver's health condition, driving history of driver, vehicle state, road slope, rain, fog, snow, night, and the like) relative to a plurality of traffic accidents occurred in a certain area.

[Mathematical Formula 2]

$$C_{Fi} = \sum_k C_k \qquad (2)$$

In addition, from among the factors $F_i$, the data analyzing unit 23 specifies one or more factors $F_i$ of which the corresponding factor coefficients $C_{Fi}$ exceed a predetermined threshold value θ and determines the specified factors $F_i$ as key factors of the traffic accidents in the area, and defines a threshold value α of each of the determined key factors. Here, the threshold value θ may be determined on the basis of the factor coefficient $C_{Fi}$ corresponding to each factor $F_i$. Furthermore, the data analyzing unit 23 determines the threshold value α for each key factor.

<Specific Example of Determination of Key Factor>

FIG. 5 illustrates an example of past accident information corresponding to five traffic accidents occurred in a certain area. FIG. 6 illustrates whether the listed factors affect the five traffic accidents.

For example, in past accident information corresponding to a traffic accident with Accident ID1, the number of damaged vehicle is one, the number of dead is zero, the number of slightly injured people is one, and the number of seriously injured people is zero. Therefore, an accident coefficient $C_1$ is calculated as follows according to the formula (1). The same applies to accident coefficients $C_2$ to $C_5$ of traffic accidents represented by Accident ID2 to Accident ID5.

$C_1=1\times0.1+0\times0.5+1\times0.1+0\times0.2=0.2$ $C_2=2\times0.1+0\times0.5+3\times0.1+0\times0.2=0.5$ $C_3=2\times0.1+1\times0.5+1\times0.1+1\times0.2=1.0$ $C_4=4\times0.1+2\times0.5+0\times0.1+2\times0.2=1.8$ $C_5=1\times0.1+1\times0.5+0\times0.1+4\times0.2=1.4$ Next, a factor coefficient $C_{Fi}$ for each of six types of key factors listed in FIG. 6 is calculated according to the formula (2). For example, only in the traffic accident with Accident ID2, the driver's health condition assumed as a factor affects the traffic accident. Therefore, a factor coefficient $C_{driver's\ bad\ state}$ corresponding to a factor $F_{driver's\ bad\ state}$ is as follows. The same applies to other factors.

$C_{driver's\ bad\ state} = C_2 = 0.5$ $C_{lack\ of\ experience} = C_1 + C_3 + C_4 = 3.0$ $C_{bad\ state\ of\ vehicle} = C_2 + C_3 = 1.5$ $C_{road\ slope} = C_1 + C_3 + C_4 = 3.0$ $C_{rain} = C_1 + C_2 + C_3 + C_4 = 3.5$ $C_{fog} = C_5 = 1.4$ $C_{snow} = 0$ $C_{night} = C_2 + C_4 = 2.3$ Here, if a threshold value θ relative to the factor coefficient $C_{Fi}$ is defined as 2.5, the factors of which the factor coefficients $C_{Fi}$ exceed 2.5, i.e., the $F_{lack\ of\ experience}$ (driving history of driver), $F_{road\ slope}$ (road slope), and $F_{rain}$ (rain) are determined as key factors.

FIG. 7 illustrates an example of threshold values a of the key factors. For example, for $F_{rain}$ (rain) that is a key factor, the precipitation amount (110 mm/h in a case of FIG. 7) is defined as a threshold value α. For $F_{road}$ slope (road slope) that is a key factor, an inclination angle (40 degrees in a case of FIG. 7) is defined as a threshold value α. For $F_{lack\ of\ experience}$ (driver's driving history) that is a key factor, the number of months (six months in a case of FIG. 7) is defined as a threshold value α.

<Relation Between Key Factors of Traffic Accident and Recommended Drive Mode>

Next, FIG. 8 illustrates an example of relation between key factors and recommended drive modes.

A parameter of the recommended drive mode in a certain area is determined on the basis of the key factor of the traffic accident and the safe driving information. For example, in a case where rain and inattentive driving are determined as key factors of a car-to-car traffic accident in a certain area, activation of a millimeter wave radar, a wiper sensor, and a driver monitor and automatic drive at a speed equal to or slower than 30 km per hour are determined as contents of the recommended drive mode.

In addition, for example, in a case where night driving and overspeed are determined as key factors of a car-to-bicycle traffic accident in a certain area, activation of the millimeter wave radar, a speed sensor, and a driver monitor and automatic drive at a speed equal to or slower than 60 km per hour are determined as contents of the recommended drive mode.

Furthermore, for example, in a case where inattentive driving is determined as a key factor of a car-to-pedestrian traffic accident in a certain area, activation of infrared radar, human-car communication, and an in-vehicle front camera and manual drive at a speed equal to or slower than 30 km per hour are determined as contents of the recommended drive mode.

<Specific Example in a Case where Execution of Recommended Drive Mode is Requested>

Next, a specific example in a case where execution of the recommended drive mode is requested will be described. In a case where parameters of one or more key factors of a traffic accident in a certain area greatly exceed the threshold values, the vehicle 10 is requested to execute the recommended drive mode.

In the following description, key factors and threshold values of a traffic accident in a certain area are as illustrated in FIG. 7.

FIG. 9 illustrates an example of a combination (Parameter Set) of real-time data acquired by controlling the sensor unit 26 by the real-time data collection control unit 25 to which the key factors of the current area are notified from the data analyzing unit 23.

In a case of a first combination of real-time data (Parameter SetID=1), the precipitation amount is 0 mm/h, the road slope is 10 degrees, and the driver's driving history is 60 months. In this case, since all the parameters of the three key factors are obviously below the threshold values, execution of the recommended drive mode is not requested.

In a case of a second combination of real-time data (Parameter SetID=2), the precipitation amount is 108 mm/h, the road slope is 41 degrees, and the driver's driving history is six months. In this case, since the parameters of the three key factors are close to the threshold values and it cannot be determined that the parameters greatly exceed the threshold values, a request to execute the recommended drive mode is suspended at this time. Then, the sensing mode is set to be a high mode, and the real-time data is sensed again.

In a case of a third combination of real-time data (Parameter SetID=3), the precipitation amount is 150 mm/h, the road slope is 60 degrees, and the driver's driving history is two months. In this case, since the parameters of the three key factors greatly exceed the respective threshold values, the execution of the recommended drive mode, for example, including limitation of a traveling speed and use of wipers is requested.

In a case of a fourth combination of real-time data (Parameter SetID=4), the precipitation amount is 150 mm/h, the road slope is 60 degrees, and the driver's driving history is 12 months. In this case, since the parameters of the two key factors (precipitation amount and road slope) greatly exceed the respective threshold values, the execution of the recommended drive mode, for example, including limitation of a traveling speed and use of wipers is requested.

In a case of a fifth combination of real-time data (Parameter SetID=5), the precipitation amount is 150 mm/h, the road slope is 30 degrees, and the driver's driving history is 12 months. In this case, since the parameter of a kind of key factor (precipitation amount) greatly exceeds the threshold value, the execution of the recommended drive mode, for example, including limitation of a traveling speed and use of wipers is requested.

<Regarding Feedback Indicating Whether Recommended Drive Mode is Executed>

FIG. 10 illustrates an example of feedback information at the time when the system control unit 28 requests the vehicle control unit 10a to execute the recommended drive mode, for example, including the limitation of the traveling speed and the use of the wipers, confirms whether the recommended drive mode can be executed, and feeds back the confirmation result to the data analyzing unit 23.

In a first example (Needed Vehicle System Set=1), in addition to that the speed can be automatically adjusted and the wiper can be activated, the information that the driver's driving history is 18 months is notified as the feedback information. Since the recommended drive mode can be executed in this case, thereafter, the sensing mode is changed to a low mode.

In a second example (Needed Vehicle System Set=2), in addition to that the speed can be automatically adjusted and the wiper can be activated, the information that the driver's driving history is two months is notified as the feedback information. Since the recommended drive mode can be executed also in this case, thereafter, the sensing mode is changed to a low mode.

In a third example (Needed Vehicle System Set=1), in addition to that the speed can be automatically adjusted and the wiper cannot be activated, the information that the driver's driving history is two months is notified as the feedback information. In this case, although speed limitation in the recommended drive mode can be performed, the wiper cannot be used. Therefore, the sensing mode is not changed from the normal mode (or high mode) after that.

In a fourth example (Needed Vehicle System Set=1), in addition to that the speed can be automatically adjusted and the wiper cannot be activated, the information that the driver's driving history is two months is notified as the feedback information. In this case, since the recommended drive mode cannot be executed, the sensing mode is not changed from the normal mode (or high mode) after that.

<Specific Example of Difference Between Normal Mode and Low Mode in Sensing Mode>

Next, FIG. 11 illustrates differences in a frequency, a range, a resolution, and sensitivity in the normal mode and the low mode of the sensing mode. As illustrated in FIG. 11, by changing the frequency and the like between the normal mode and the low mode of the sensing mode, energy saving can be realized in the low mode.

<Specific Example of Determination of Warning Level>

Next, a specific example of determination of the warning level will be described. In the following description, key factors and threshold values of a traffic accident in a certain area are as illustrated in FIG. 7. Furthermore, the first threshold value n to be compared with the number k of key factors that greatly exceed the threshold values a is defined as one, and the second threshold value m is defined as two.

FIG. 12 illustrates an example of a combination (Parameter Set) of real-time data acquired by controlling the sensor unit 26 by the real-time data collection control unit 25 to which the key factors of the current area are notified from the data analyzing unit 23.

In a case of a first combination of real-time data (Scenario ID=1), the precipitation amount is 108 mm/h, the road slope is 60 degrees, and the driver's driving history is two months. In this case, since the number k of key factors (road slope and driving history) exceeding the threshold values is expressed as k=2 and the second threshold value m k is satisfied. Therefore, the warning level is determined to be a high level.

In a case of a second combination of real-time data (Scenario ID=2), the precipitation amount is 108 mm/h, the road slope is 43 degrees, and the driver's driving history is 12 months. In this case, although the parameters of the key factors are close to the threshold values, the parameters do not greatly exceed the threshold values. Therefore, the determination of the warning level is suspended, the sensing mode is set to a high mode, and the real-time data is sensed again.

In a case of a third combination of real-time data (Scenario ID=3), the precipitation amount is 150 mm/h, the road slope is 55 degrees, and the driver's driving history is three months. In this case, since the number k of key factors (road slope, precipitation amount, and driving history) exceeding the threshold values is expressed as k=3 and the second threshold value m≤k is satisfied. Therefore, the warning level is determined to be a high level.

In a case of a fourth combination of real-time data (Scenario ID=4), the precipitation amount is 0 mm/h, the road slope is 20 degrees, and the driver's driving history is one month. In this case, since the number k of key factors (driving history) exceeding the threshold values is expressed as k=1 and the first threshold value n≤k<the second threshold value m is satisfied. Therefore, the warning level is determined to be a middle level.

In a case of a fifth combination of real-time data (Scenario ID=2), the precipitation amount is 0 mm/h, the road slope is 10 degrees, and the driver's driving history is 60 months. In this case, since the number k of key factors (driving history) exceeding the threshold values is expressed as k=0 and 0≤k<the first threshold value n is satisfied. Therefore, the warning level is determined to be a middle level.

<Operation of Information Processing Apparatus 20>

Next, an operation of the information processing apparatus 20 will be described.

Figure 13:
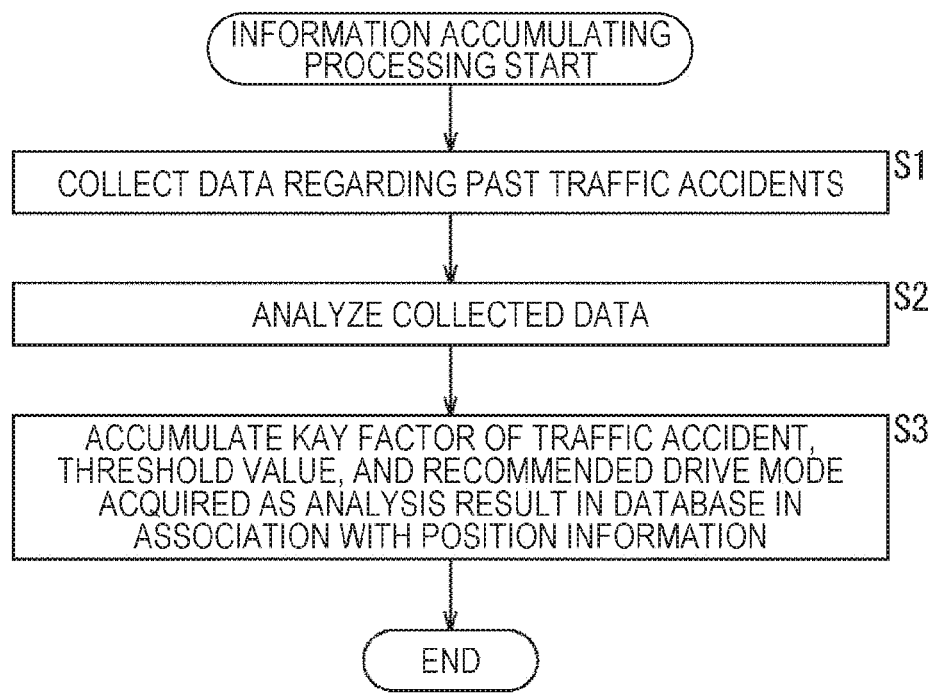
FIG. 13 is a flowchart to describe information accumulating processing.

FIG. 13 is a flowchart to describe the information accumulating processing by the information processing apparatus 20.

In step S1, for example, the past data collecting unit 22 acquires the past accident information and the safe driving information from the cloud server 12 and supplies the information to the data analyzing unit 23. In step S2, the data analyzing unit 23 analyzes the past accident information supplied from the past data collecting unit 22 in the information accumulating processing. Specifically, a main factor (key factor) of a traffic accident occurred in each area and a threshold value thereof are determined. Furthermore, on the basis of the determined key factor of the traffic accident, the threshold value, and the safe driving information supplied from the past data collecting unit 22, a recommended drive mode for each area is determined.

In step S3, the data analyzing unit 23 outputs the analysis result to the database 24. The database 24 accumulates the analysis result input from the data analyzing unit 23, that is, the key factor of the traffic accident for each area, the threshold value, and the recommended drive mode in association with position information of the area. Then, the information accumulating processing is terminated. The information accumulating processing is repeated at a predetermined cycle.

Figure 14:
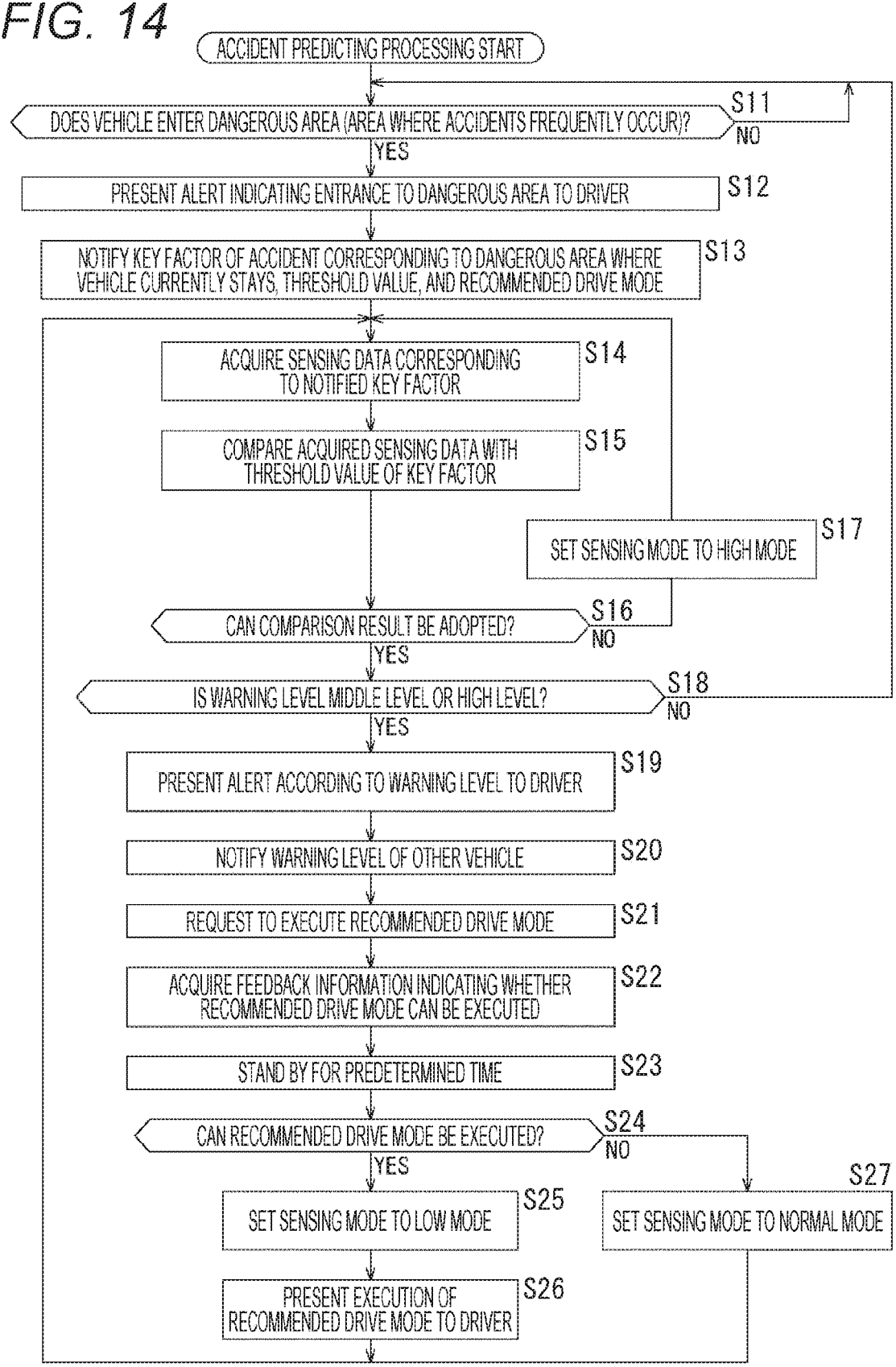
FIG. 14 is a flowchart to describe accident predicting processing.

Next, FIG. 14 is a flowchart to describe the accident predicting processing by the information processing apparatus 20.

The accident predicting processing is started in response to the start of the vehicle 10 (for example, turn on ignition button) in which the information processing apparatus 20 is mounted.

Figure 15:
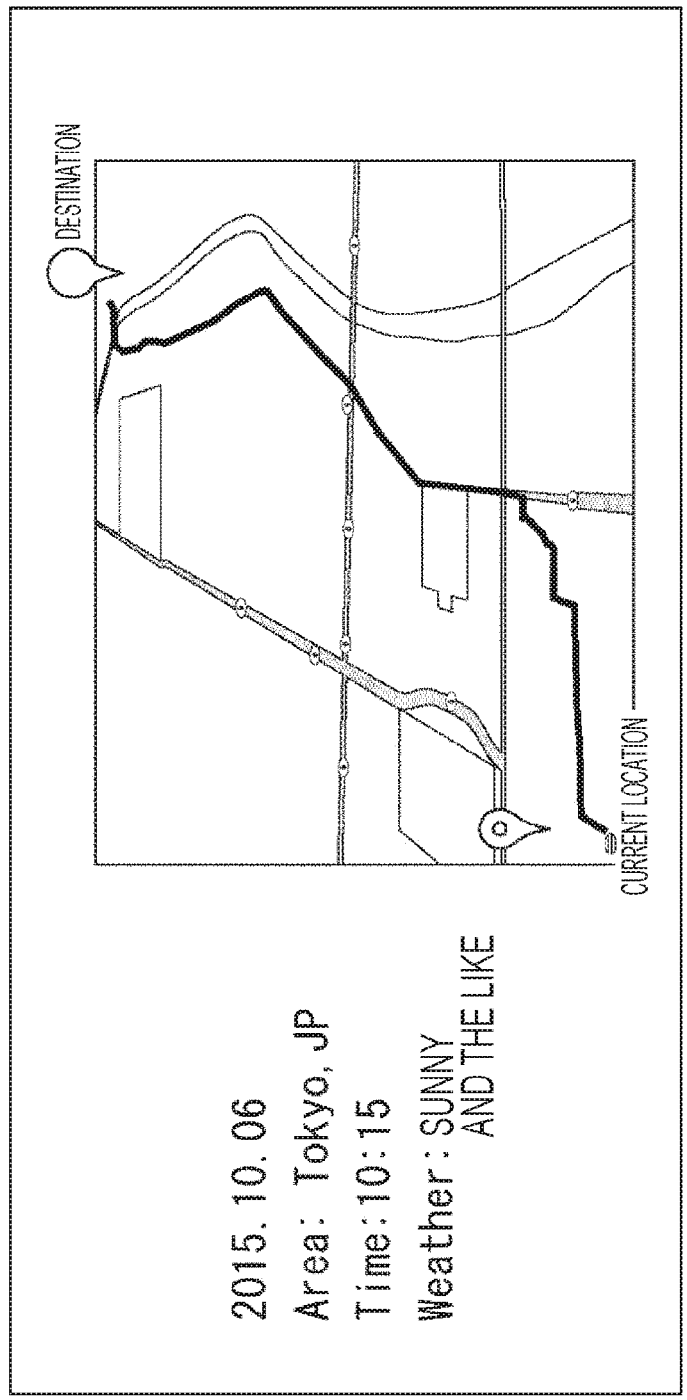
FIG. 15 is a view of an exemplary display of a general navigation screen.

In step S11, it is determined whether the vehicle 10 enters a dangerous area (area where accidents frequently occur), and the processing stands by until the vehicle 10 enters the dangerous area. During the standby period, the warning unit 29 displays general information (date, area, weather, and the like) and a navigation screen (map overlapped with route from current location to destination), for example, as illustrated in FIG. 15 on a display of the vehicle 10.

Thereafter, in a case where the vehicle 10 has entered the dangerous area, the processing proceeds to step S12. Note that the processing may proceed to step S12 when it is determined that the vehicle 10 will soon enter the dangerous area.

Figure 16:
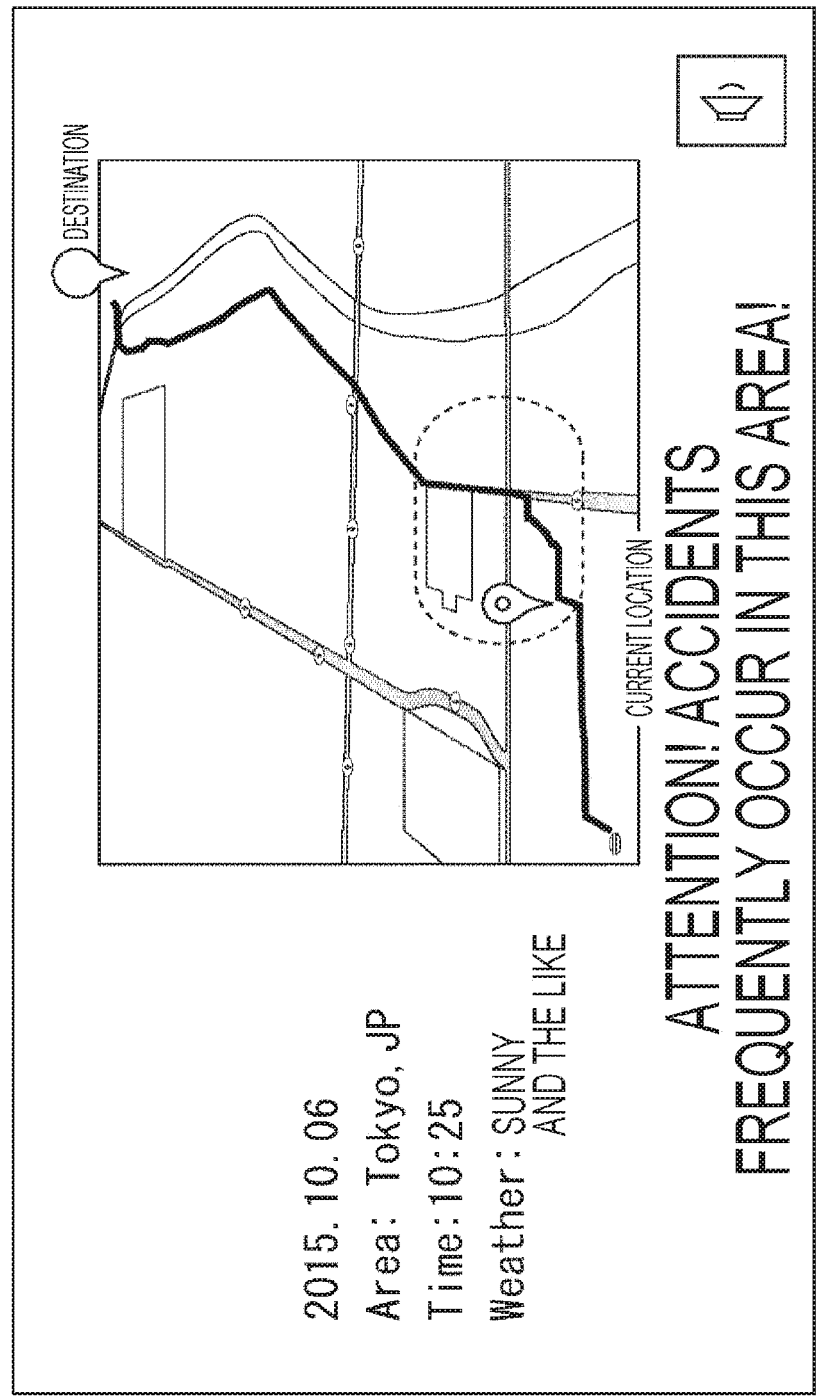
FIG. 16 is a view of an exemplary warning display indicating that the vehicle has entered a dangerous area.

In step S12, the warning unit 29 displays a warning display such as "Attention. Accidents frequently occur in this area!" as illustrated in FIG. 16 at several times (for example, once or twice) on the display of the vehicle 10 and outputs similar warning sounds.

In step S13, the database 24 notifies the key factors of the car traffic accident, the threshold value, and the recommended drive mode corresponding to the dangerous area of the data analyzing unit 23. The data analyzing unit 23 notifies the notified key factors of the real-time data collection control unit 25 and notifies the recommended drive mode of the system control unit 28.

In step S14, the real-time data collection control unit 25 makes the sensor unit 26 acquire real-time vehicle information and real-time driver's information corresponding to the key factors on the basis of the notified key factors of the dangerous area. Note that the initial setting of the sensing mode for the sensor unit 26 is a normal mode. Furthermore, the real-time data collection control unit 25, furthermore, the real-time data collection control unit 25 controls the communication unit 27 to acquire vehicle information and driver's information of the other vehicle on the basis of the notified key factors of the dangerous area.

The vehicle information and the driver's information of the vehicle acquired by the sensor unit 26 and the vehicle information and the driver's information of the other vehicle acquired by the communication unit 27 (collectively referred to "sensing data" below) are supplied to the data analyzing unit 23.

In step S15, the data analyzing unit 23 compares the supplied sensing data corresponding to the key factors of the dangerous area with the threshold values a. In step S16, the data analyzing unit 23 determines whether the comparison result in step S15 can be adopted. Specifically, in a case where the value of the sensing data acquired in a state where the sensing mode is set to a normal mode is close to the corresponding threshold value α, it is determined that the comparison result cannot be adopted. Conversely, in a case where the value of the sensing data acquired in a state where the sensing mode is set to a normal mode is sufficiently separated from the corresponding threshold value α, it is determined that the comparison result can be adopted. Furthermore, in a case where the value of the sensing data is acquired in a state where the sensing mode is set to a high mode, it is determined that the comparison result can be adopted.

In a case where it is determined in step S16 that the comparison result in step S15 cannot be adopted, the processing proceeds to step S17.

In step S17, the data analyzing unit 23 notifies the real-time data collection control unit 25 that the comparison result in step S15 cannot be adopted. According to the notification, the real-time data collection control unit 25 sets the sensing mode of the sensor unit 26 to the high mode. Thereafter, the processing in steps S14 to S16 is executed again.

In a case where it is determined in step S16 that the comparison result in step S15 can be adopted, the processing proceeds to step S18.

In step S18, the data analyzing unit 23 determines the warning level on the basis of the comparison result in step S15 and determines whether the warning level is the middle level or the high level. In a case where the warning level is not the middle level or the high level, that is, in a case where the warning level is the low level, the processing returns to step S11 and stands by until the vehicle 10 enters a next dangerous area.

Conversely, in a case where the warning level is the middle level or the high level, the data analyzing unit 23 notifies the warning level (middle level or high level) of the sensor unit 27, the system control unit 28, and the warning unit 29. Thereafter, the processing proceeds to step S19.

In step S19, the warning unit 29 presents a warning according to the notified warning level and the key factor to a driver.

Figure 17:
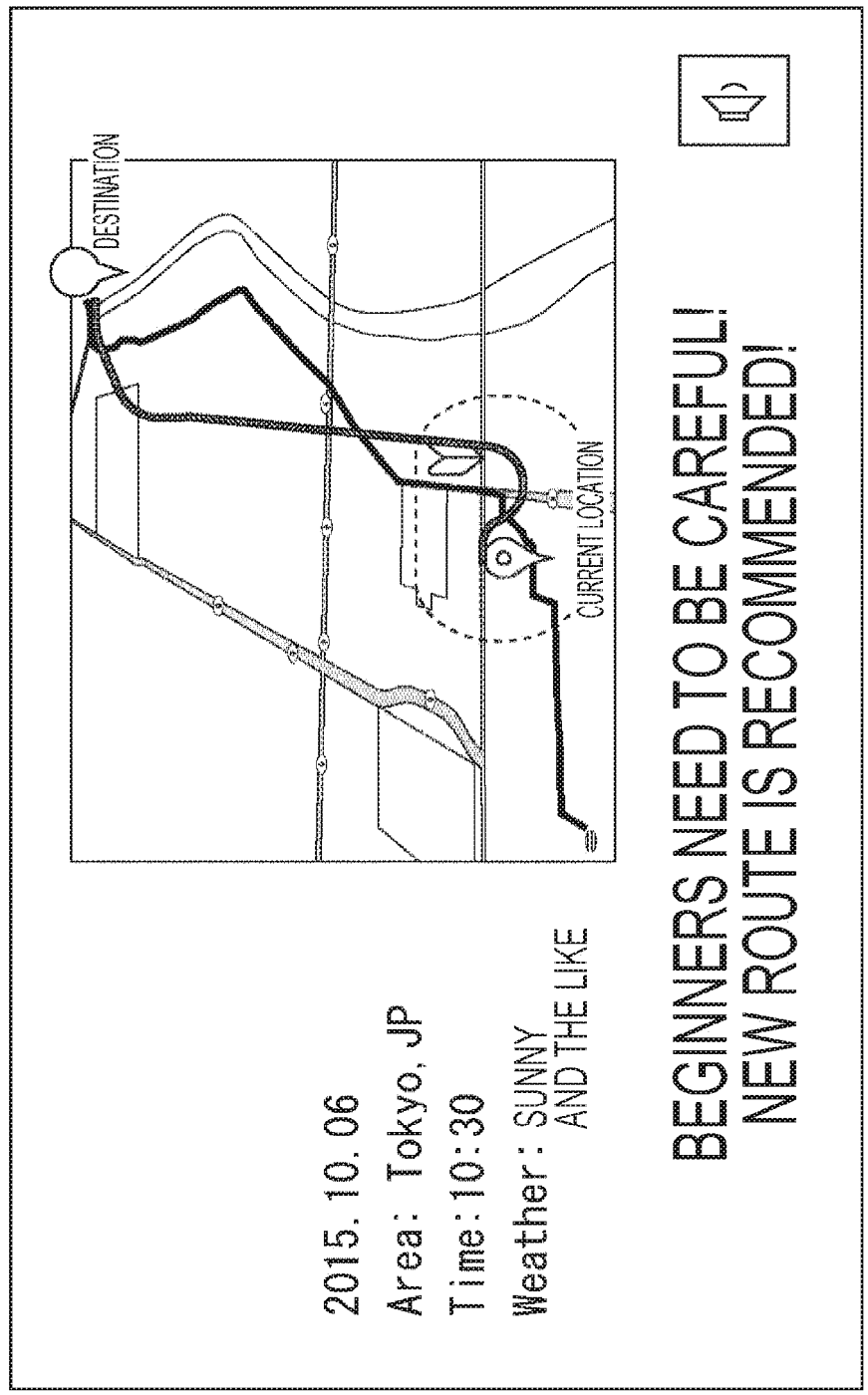
FIG. 17 is a diagram of an example of a high-level warning display.

Specifically, in a case where the warning level is the high level, a warning display such as "Beginners need to be careful. New route is recommended!" as illustrated in FIG. 17 and "Please be careful of sharp curve. Please slow down (not shown)" are continuously displayed on the display of the vehicle 10, similar warning sound is output. Furthermore, a new route is displayed on the navigation screen.

Figure 18:
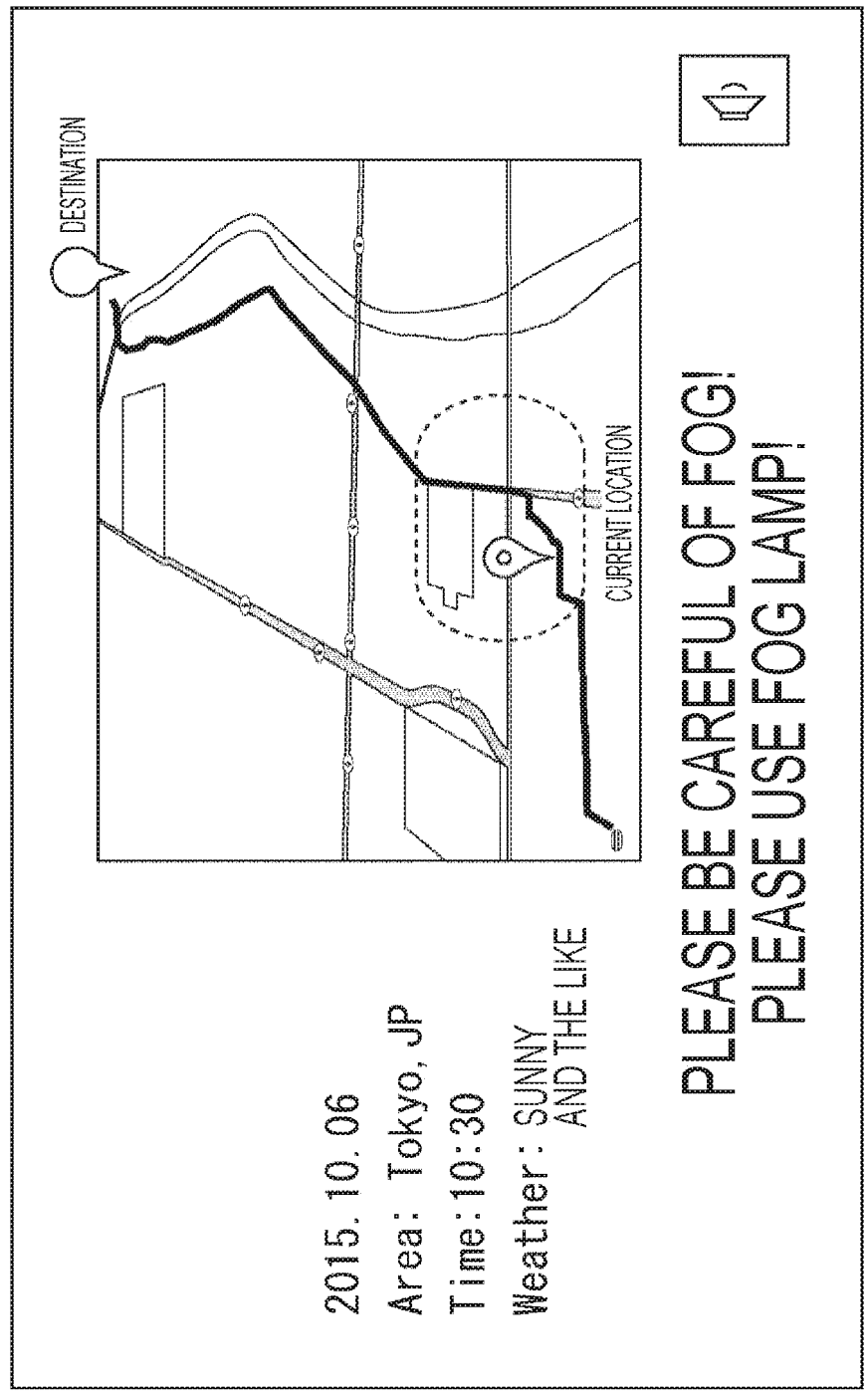
FIG. 18 is a diagram of an example of a middle-level warning display.

Furthermore, in a case where the warning level is the middle level, a warning display such as "Please be careful of fog. Please use fog lamp!" as illustrated in FIG. 18 is displayed on the display of the vehicle 10 at several times, and the similar warning sound is output. Furthermore, a new route is displayed on the navigation screen.

In step S20, the communication unit 27 notifies the warning level of the vehicle of the other vehicle.

In step S21, in response to the notification of the warning level from the data analyzing unit 23, the system control unit 28 requests the vehicle control unit 10a to execute the recommended drive mode notified in step S13. In response to the request, the vehicle control unit 10a notifies the feedback information indicating whether the recommended drive mode can be executed of the system control unit 28 and starts to execute the recommended drive mode in a case where the recommended drive mode can be executed (including a case where recommended drive mode can be partially executed).

In step S22, the system control unit 28 acquires the feedback information notified from the vehicle control unit 10a and notifies the information of the data analyzing unit 23.

Thereafter, after standby for a predetermined time (for example, several seconds to several tens of seconds) in step S23, the processing proceeds to step S24.

In step S24, the data analyzing unit 23 determines whether the recommended drive mode can be executed on the basis of the feedback information notified from the system control unit 28. In a case where it is determined that the recommended drive mode can be executed, the processing proceeds to step S25. In step S25, the data analyzing unit 23 notifies that the recommended drive mode can be executed of the real-time data collection control unit 25. According to the notification, the real-time data collection control unit 25 sets the sensing mode of the sensor unit 26 to the low mode.

Figure 19:
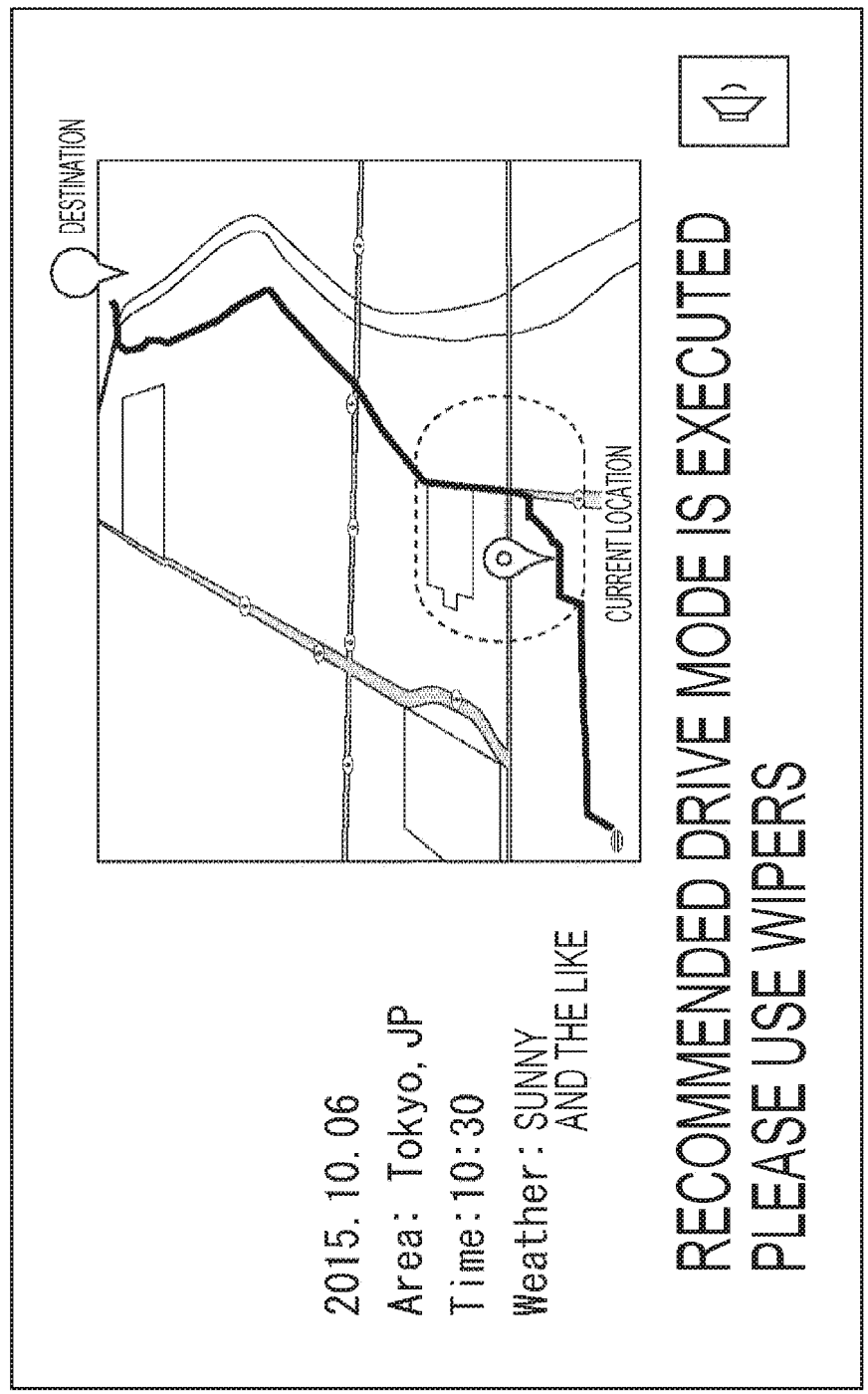
FIG. 19 is a diagram of an exemplary screen display for notifying execution of the recommended drive mode.
Figure 20:
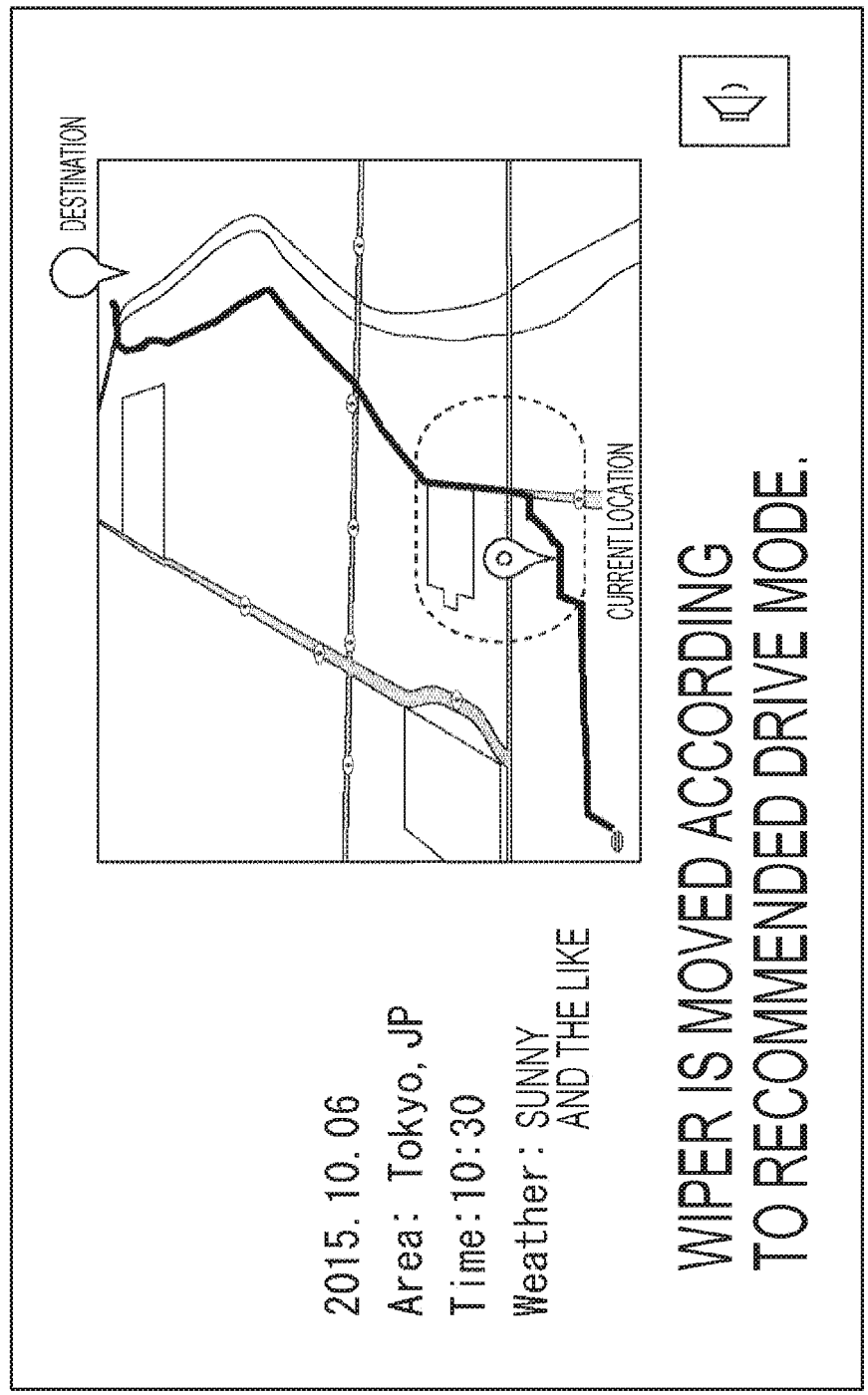
FIG. 20 is a diagram of an exemplary screen display for notifying execution of the recommended drive mode.

In step S26, the data analyzing unit 23 notifies that the recommended drive mode can be executed of the warning unit 29. In response to the notification, the warning unit 29 presents to the driver with the warning screen that the recommended drive mode is executed. In the warning screen, for example, a predetermined operation may be urged to the driver, such as "Please use wipers" as illustrated in FIG. 19. Alternatively, as performing a predetermined operation (activation of wipers in this case) instead of the driver, the warning unit 29 may notify that the predetermined operation is performed instead of the driver, with a notification such as "Wiper is moved according to recommended drive mode" as illustrated in FIG. 20. Thereafter, the processing returns to step S14, and the subsequent processing is repeated.

Incidentally, in addition to the example illustrated in FIGS. 19 and 20, as a message to be presented to the driver indicating that the recommended drive mode is executed, following examples can be used, for example.

"Traveling speed is set to 40 km/h as recommended drive mode"

"Motor traveling is switched to engine traveling as recommended drive mode"

"Sensing mode is switched from forward sensing mode to omnidirectional sensing mode as recommended drive mode"

"Headlamps are turned on as recommended drive mode"

"Manual drive is switched to automatic drive as recommended drive mode. Please press OK button if you are ready" and the like On the other hand, in a case where it is determined in step S24 that the recommended drive mode cannot be executed, the processing proceeds to step S27. In step S27, the data analyzing unit 23 notifies the real-time data collection control unit 25 and the warning unit 29 that the recommended drive mode cannot be executed. According to the notification, the real-time data collection control unit 25 sets the sensing mode of the sensor unit 26 to the normal mode. The warning unit 29 presents to the driver that the recommended drive mode cannot be executed with a warning display such as "Recommended drive mode cannot be executed. Please drive carefully". Note that, in a case where the sensing mode is already the normal mode, the setting of the sensing mode of the sensor unit 26 can be omitted. Thereafter, the processing returns to step S14, and the subsequent processing is repeated.

According to the accident predicting processing described above, prediction of a car traffic accident in which the vehicle is involved, more specifically, issuance of stepwise warning levels is available on the basis of not only the information of the vehicle and the driver of the vehicle but also the information of the other vehicle and the driver of the other vehicle.

Note that, in the above description, the warning level includes three levels. However, the number of levels may be one, two, or three or more.

<A Case of Realizing Information Processing Apparatus 20 by Program>

The information processing apparatus 20 for executing the series of processing can be realized with hardware and software. In a case where the series of the processing is performed by the software, a program included in the software is installed in a computer. Here, the computer includes a computer incorporated in dedicated hardware and, for example, a general personal computer which can perform various functions by installing various programs.

Figure 21:
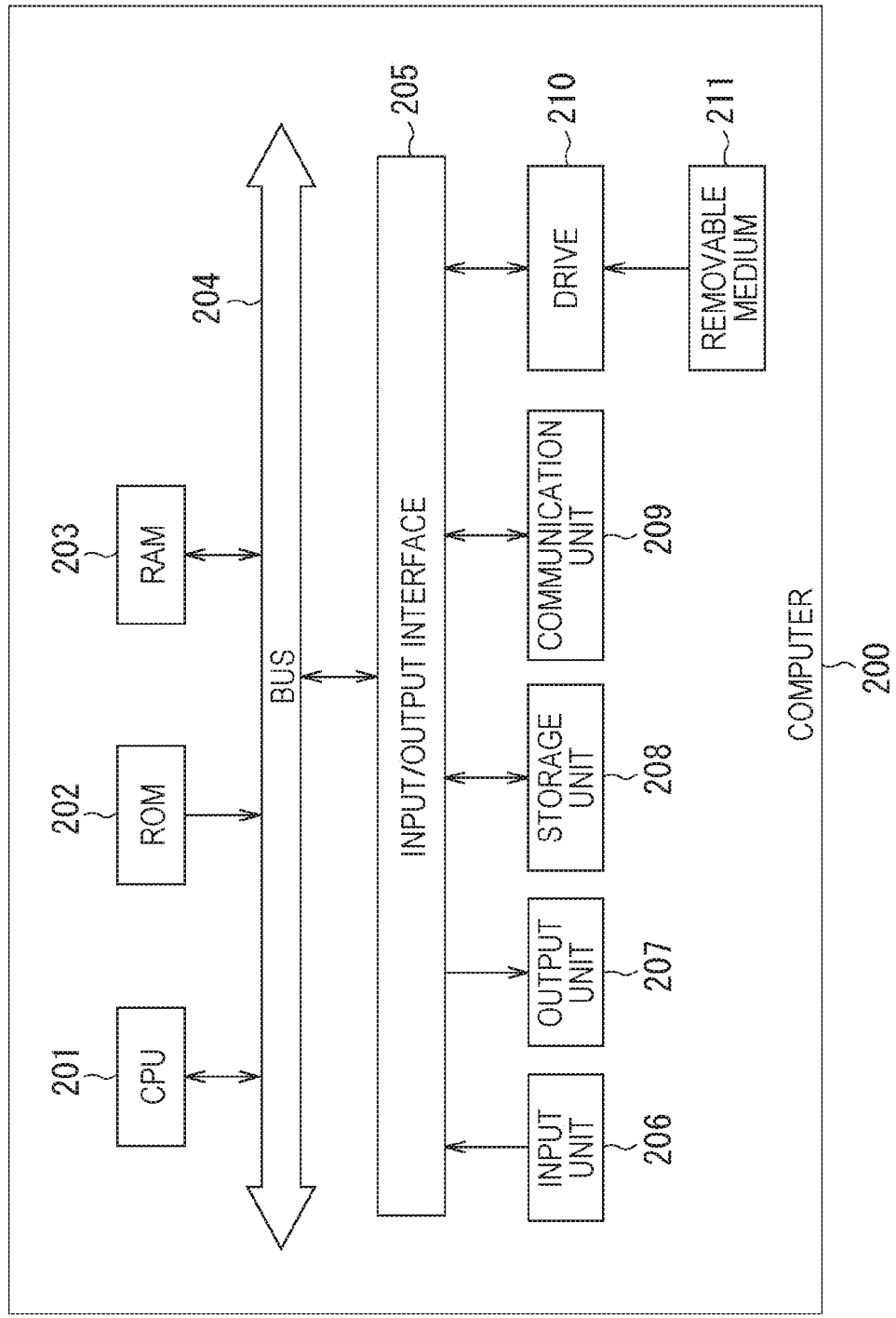
FIG. 21 is a block diagram of an exemplary configuration of a general-purpose computer.

FIG. 21 is a block diagram of an exemplary configuration of hardware of the computer for executing the above-mentioned series of processing by the program.

In a computer 200, a central processing unit (CPU) 201, a read only memory (ROM) 202, and a random access memory (RAM) 203 are connected to each other with a bus 204.

In addition, an input/output interface 205 is connected to the bus 204. An input unit 206, an output unit 207, a storage unit 208, a communication unit 209, and a drive 210 are connected to the input/output interface 205.

The input unit 206 includes a keyboard, a mouse, a microphone, and the like. The output unit 207 includes a display, a speaker, and the like. The storage unit 208 includes a hard disk, a non-volatile memory, and the like. The communication unit 209 includes a network interface and the like. The drive 210 drives a removable medium 211 such as a magnetic disk, an optical disk, an optical magnetic disk, or a semiconductor memory.

In the computer 200 configured as above, the CPU 201 loads, for example, a program stored in the storage unit 208 to the RAM 203 via the input/output interface 205 and the bus 204 and executes the program so that the above-mentioned series of processing is executed.

The program executed by the computer (CPU 201), for example, can be provided by recording it to the removable medium 211 as a package medium and the like. Furthermore, the program can be provided via a wired or wireless transmission media such as a local area network, the internet, and digital satellite broadcasting.

In the computer 200, the program can be installed to the storage unit 208 via the input/output interface 205 by mounting the removable medium 211 in the drive 210. Furthermore, the program can be received by the communication unit 209 via the wired or wireless transmission media and installed to the storage unit 208. In addition, the program can be previously installed to the ROM 202 and the storage unit 208.

Note that, the program performed by the computer 200 may be a program in which processing is performed along the order described herein in a time series manner and a program in which the processing is performed in parallel or at a necessary timing, for example, when a call has been performed.

The embodiment of the present disclosure is not limited to the embodiment described above and can be variously changed without departing from the scope of the present disclosure.

The present disclosure can have configurations below.

(1) An information processing apparatus including:
a sensing unit configured to sense surrounding environment;
a reception unit configured to receive information to prevent an accident regarding a predetermined area according to a current position; and
a control unit configured to change a parameter with which the sensing unit senses the surrounding environment on the basis of the information to prevent an accident received from the reception unit and a performance of the sensing unit.

(2) The information processing apparatus according to (1), in which
the information to prevent an accident includes information regarding a condition of a past traffic accident, information regarding a predetermined parameter to be set at the time of traveling, or a predetermined parameter with which the sensing unit senses the surrounding environment.

(3) The information processing apparatus according to (1) or (2), in which
the control unit issues a warning by an image or sound on the basis of the information to prevent an accident received from the reception unit.

(4) The information processing apparatus according to any one of (1) to (3), in which
the control unit issues a warning on the basis of the information to prevent an accident received from the reception unit and the performance of the sensing unit.

(5) The information processing apparatus according to any one of (1) to (4), in which
the control unit controls to notify and execute a recommended drive mode on the basis of the information to prevent an accident received from the reception unit.

(6) The information processing apparatus according to any one of (1) to (5), further including:
a determination unit configured to determine a warning level regarding a traffic accident in which the first vehicle may be involved on the basis of the information to prevent an accident received from the reception unit; and
a warning unit configured to present a warning to a driver of the first vehicle according to the determined warning level.

(7) The information processing apparatus according to (6), in which
the warning unit presents a warning to the driver of the first vehicle according to feedback information indicating whether a recommended drive mode can be executed.

(8) The information processing apparatus according to (7), in which
the recommended drive mode includes at least one of a limited traveling speed, on/off of lights, on/off of wipers, on/off of defrosters, an audio volume, activation of various sensors, use of automatic drive (speed control, steering control, front vehicle following, automatic braking, and the like), and change of a traveling route.

(9) The information processing apparatus according to any one of (1) to (8), in which
the information to prevent an accident received from the reception unit includes a key factor of the traffic accident and a threshold value of the key factor.

(10) The information processing apparatus according to (6), in which
the determination unit determines a stepwise warning level regarding the traffic accident in which the first vehicle may be involved on the basis of the number of key factors of which collected value exceeds the threshold value.

(11) The information processing apparatus according to any one of (1) to (10), further including:
an acquisition unit configured to acquire information regarding traffic accidents occurred in the past;
an analysis unit configured to analyze the acquired information regarding the traffic accidents occurred in the past; and
an accumulation unit configured to accumulate a result of the analysis of the acquired information regarding the traffic accidents occurred in the past in association with each area.

(12) The information processing apparatus according to (11), in which
the information regarding the traffic accidents occurred in the past includes at least one of a date and time, a place, weather, a road condition, an accident situation, vehicle information, or driver's information.

(13) The information processing apparatus according to any one of (1) to (12), in which
the control unit changes a sensing mode of the sensing unit to a high mode in a case where a comparison result of the result of the analysis of the traffic accidents occurred in the past with sensed information cannot be adopted.

(14) The information processing apparatus according to (1) to (13), in which
the control unit changes a sensing mode of the sensing unit to a low mode in a case where the recommended drive mode can be executed.

(15) The information processing apparatus according to any one of (1) to (14), in which
the sensing unit collects information regarding a second vehicle traveling around the first vehicle from the second vehicle via V2V communication.

(16) The information processing apparatus according to any one of (1) to (15), in which
the driver's information includes at least one of an age, gender, a height, a weight, a visual acuity, a pulse rate, a heart rate, a blood pressure, a respiration rate, the number of times of blinks and yawning, personality, medical history, medication history, driver's license type, driving history, traffic accident history, traffic violation history, or criminal record.

(17) The information processing apparatus according to any one of (1) to (16), in which
the vehicle information includes at least one of a manufacturer, a vehicle type, a model year, a size, a weight, a date of manufacture, a cumulative travel distance, a traveling speed, a capacity, a load, a tire pressure, an operation condition of lights, an operation condition of wipers, or an operation condition of defrosters.

(18) An information processing method including:
a sensing step of sensing surrounding environment;
a reception step of receiving information to prevent an accident regarding a predetermined area according to a current position; and
a control step of changing a parameter used to sense the surrounding environment in the sensing step on the basis of the received information to prevent an accident and a performance of sensing,
the steps being performed by an information processing apparatus.

(19) A program for causing a computer to function as:
a sensing unit configured to sense surrounding environment;
a reception unit configured to receive information to prevent an accident regarding a predetermined area according to a current position; and
a control unit configured to change a parameter with which the sensing unit senses the surrounding environment on the basis of the information to prevent an accident received from the reception unit and a performance of the sensing unit.

(20) A vehicle for traveling according to an operation by a driver, the vehicle including:
an information processing unit configured to predict a traffic accident in which the vehicle may be involved; and
a power supply unit configured to supply power to the information processing unit, in which
the information processing unit includes:
a sensing unit configured to sense surrounding environment;
a reception unit configured to receive information to prevent an accident regarding a predetermined area according to a current position; and
a control unit configured to change a parameter with which the sensing unit senses the surrounding environment on the basis of the information to prevent an accident received from the reception unit and a performance of the sensing unit.

REFERENCE SIGNS LIST

10 Vehicle
10a Vehicle control unit
11 Communication base station
12 Cloud server
20 Information processing apparatus
21 Data analyzing unit
22 Past data collecting unit
23 Data analyzing unit
24 Database
25 Real-time data collection control unit
26 Sensor unit
27 Communication unit
28 System control unit
29 Warning unit
200 Computer
201 CPU

The invention claimed is:
1. An information processing apparatus, comprising:
at least one sensor configured to sense surrounding environment and acquire real-time sensor information; and
a central processing unit (CPU) configured to:
receive information related to a specific area based on a position of the specific area, wherein the information related to the specific area comprises a condition of occurrence of past traffic accidents in the specific area;
determine, based on the received information, a plurality of key factors for the past traffic accidents and a plurality of threshold values associated with the plurality of key factors, wherein the real-time sensor information corresponds to the plurality of key factors for the past traffic accidents;
compare a value of key factor for each of the plurality of the key factors with a corresponding threshold value of the plurality of threshold values;
determine a count of key factors for which the value of the key factor exceeds the corresponding threshold value;
execute a recommended drive mode based on the determined count of key factors; and
change a parameter associated with the at least one sensor based on the recommended drive mode, wherein the at least one sensor is further configured to sense the surrounding environment based on the changed parameter.

2. The information processing apparatus according to claim 1, wherein the information related to the specific area further comprises information regarding a specific parameter set at a time of travel on a route that includes the specific area.

3. The information processing apparatus according to claim 1, wherein
the CPU is further configured to issue a warning based on the information related to the specific area, and
the warning includes an image or a sound.

4. The information processing apparatus according to claim 3, wherein the CPU is further configured to issue the warning based on a performance of the at least one sensor.

5. The information processing apparatus according to claim 1, wherein the CPU is further configured to:
determine a warning level regarding a traffic accident based on the information related to the specific area, wherein the traffic accident is associated with a first vehicle; and
present a warning to a driver of the first vehicle based on the determined warning level.

6. The information processing apparatus according to claim 5, wherein
the CPU is further configured to present the warning to the driver of the first vehicle based on feedback information, and
the feedback information indicates information on the execution of the recommended drive mode.

7. The information processing apparatus according to claim 1, wherein
the recommended drive mode includes at least one of a limited traveling speed, on/off of lights, on/off of wipers, on/off of defrosters, an audio volume, activation of various sensors, use of automatic drive, or a change of a traveling route, and the automatic drive includes at least a speed control function, a steering control function, a front vehicle following function and an automatic braking function.

8. The information processing apparatus according to claim 5, wherein
the CPU is further configured to determine the warning level based on the count of the key factors for which the value of the key factor exceeds the corresponding threshold value,
the count of the key factors is greater than a specific value, and
the warning level is a stepwise warning level.

9. The information processing apparatus according to claim 2, wherein the CPU is further configured to:
acquire accident information associated with the past traffic accidents;
analyze the acquired accident information; and
accumulate a result of the analysis of the acquired accident information.

10. The information processing apparatus according to claim 9, wherein the acquired accident information includes at least one of a date and time, a place, weather, a road condition, an accident situation, vehicle information, or driver's information.

11. The information processing apparatus according to claim 9, wherein
the parameter associated with the at least one sensor is a sensing mode,
the CPU is further configured to change the sensing mode of the at least one sensor to a high mode based on the result of the analysis of the acquired accident information.

12. The information processing apparatus according to claim 1, wherein
the parameter associated with the at least one sensor is a sensing mode,
the CPU is further configured to change the sensing mode of the at least one sensor to a low mode based on the execution of the recommended drive mode.

13. The information processing apparatus according to claim 5, wherein
the CPU is further configured to collect information regarding a second vehicle,
the second vehicle is in a specific proximity to the first vehicle, and
the information regarding the second vehicle is collected from the second vehicle via V2V communication.

14. An information processing method, comprising:
sensing surrounding environment;
receiving information related to a specific area based on a position of the specific area, wherein the information related to the specific area comprises a condition of occurrence of past traffic accidents in the specific area;
determining, based on the received information, a plurality of key factors for the past traffic accidents and a plurality of threshold values associated with the plurality of key factors;
acquiring real-time sensor information corresponding to the plurality of key factors for the past traffic accidents;
comparing a value of key factor for each of the plurality of the key factors with a corresponding threshold value of the plurality of threshold values;
determining a count of key factors for which the value of the key factor exceeds the corresponding threshold value;
executing a recommended drive mode based on the determined count of key factors; and
changing a parameter based on the recommended drive mode, wherein the parameter is associated with the sensing of the surrounding environment.

15. A non-transitory computer-readable medium having stored thereon, computer-executable instructions which, when executed by a computer, cause the computer to execute operations, the operations comprising:
sensing surrounding environment;
receiving information related to a specific area based on a position of the specific area, wherein the information related to the specific area comprises a condition of occurrence of past traffic accidents in the specific area;
determining, based on the received information, a plurality of key factors for the past traffic accidents and a plurality of threshold values associated with the plurality of key factors;
acquiring real-time sensor information corresponding to the plurality of key factors for the past traffic accidents;
comparing a value of key factor for each of the plurality of the key factors with a corresponding threshold value of the plurality of threshold values;
determining a count of key factors for which the value of the key factor exceeds the corresponding threshold value;
executing a recommended drive mode based on the determined count of key factors; and
changing a parameter based on the recommended drive mode, wherein the parameter is associated with the sensing of the surrounding environment.

16. A vehicle, comprising:
a central processing unit (CPU) configured to predict a traffic accident in which the vehicle may be involved;
a power supply source configured to supply power to the CPU; and
at least one sensor configured to sense surrounding environment and acquire real-time sensor information, wherein
the CPU is further configured to:
receive information related to a specific area based on a position of the specific area, wherein the information related to the specific area comprises a condition of occurrence of past traffic accidents in the specific area;
determine, based on the received information, a plurality of key factors for the past traffic accidents and a plurality of threshold values associated with the plurality of key factors, wherein the real-time sensor information corresponds to the plurality of key factors for the past traffic accidents;
compare a value of key factor for each of the plurality of the key factors with a corresponding threshold value of the plurality of threshold values;
determine a count of key factors for which the value of the key factor exceeds the corresponding threshold value;
execute a recommended drive mode based on the determined count of key factors; and
change a parameter associated with the at least one sensor based on the recommended drive mode, wherein the at least one sensor is further configured to sense the surrounding environment based on the changed parameter.

* * * * *